(12) United States Patent
Kondo et al.

(10) Patent No.: US 8,395,713 B2
(45) Date of Patent: Mar. 12, 2013

(54) MULTI-SCREEN TELEVISION RECEIVER REMOTE CONTROL SYSTEM, REMOTE CONTROLLER AND OPERATION METHOD, MULTI-SCREEN TELEVISION RECEIVER AND OPERATION METHOD, RECORDING MEDIA, AND PROGRAM

(75) Inventors: Tetsujiro Kondo, Tokyo (JP); Yasushi Tatehira, Kanagawa (JP); Ichiro Katagiri, Tokyo (JP); Tsuyoshi Tanaka, Kanagawa (JP)

(73) Assignee: Sony Corporation (JP)

( * ) Notice: Subject to any disclaimer, the term of this patent is extended or adjusted under 35 U.S.C. 154(b) by 1475 days.

(21) Appl. No.: 11/520,977

(22) Filed: Sep. 14, 2006

(65) Prior Publication Data

US 2007/0064147 A1    Mar. 22, 2007

(30) Foreign Application Priority Data

Sep. 15, 2005    (JP) .............................. P2005-267774

(51) Int. Cl.
*H04N 5/44* (2011.01)
*H04N 9/64* (2006.01)
*G09G 5/00* (2006.01)

(52) U.S. Cl. .......................... 348/734; 348/578; 345/1.1
(58) Field of Classification Search .................. 348/734, 348/729, 564
See application file for complete search history.

(56) References Cited

U.S. PATENT DOCUMENTS

| | | | | |
|---|---|---|---|---|
| 4,825,209 A | * | 4/1989 | Sasaki et al. | 340/12.55 |
| 5,459,477 A | * | 10/1995 | Fukuda et al. | 345/2.1 |
| 5,727,060 A | * | 3/1998 | Young | 348/734 |
| 5,838,384 A | * | 11/1998 | Schindler et al. | 348/563 |
| 6,118,493 A | * | 9/2000 | Duhault et al. | 348/564 |
| 6,400,303 B2 | * | 6/2002 | Armstrong | 341/176 |
| 6,759,967 B1 | * | 7/2004 | Staller | 340/12.28 |
| 6,784,805 B2 | * | 8/2004 | Harris et al. | 340/12.22 |
| 6,996,837 B1 | * | 2/2006 | Miura et al. | 725/78 |
| 7,038,738 B2 | * | 5/2006 | Kwon, II | 348/734 |

FOREIGN PATENT DOCUMENTS

| | | |
|---|---|---|
| JP | 57178484 A | 11/1982 |
| JP | 05-63163 U | 8/1993 |
| JP | 07264434 A | 10/1995 |
| JP | 2000156792 A | 6/2000 |
| JP | 2000242248 A | 9/2000 |
| JP | 2003143435 A | 5/2003 |
| JP | 2003195843 A | 7/2003 |
| JP | 2003198972 A | 7/2003 |
| JP | 2003280623 A | 10/2003 |

(Continued)

OTHER PUBLICATIONS

Office Action from Japanese Application No. 2005-267774, dated Nov. 9, 2010.

*Primary Examiner* — Jefferey Harold
*Assistant Examiner* — Michael Teitelbaum
(74) *Attorney, Agent, or Firm* — Lerner, David, Littenberg, Krumholz & Mentlik, LLP

(57) ABSTRACT

A multi-screen television receiver remote control system includes a multi-screen television receiver including a plurality of television receivers, and a remote controller for controlling the multi-screen television receiver. In the multi-screen television receiver remote control system, the remote controller includes a determining section, a manipulating section, a remote control command generating section, and a transmitting section. The multi-screen television receiver includes a receiving section, a recognizing section, and an executing section.

13 Claims, 22 Drawing Sheets

FOREIGN PATENT DOCUMENTS

| | | | |
|---|---|---|---|
| JP | 2003319290 A | 11/2003 | |
| JP | 2004173277 A | 6/2004 | |
| JP | 2005117183 A | 4/2005 | |
| JP | 2006311363 A | 11/2006 | |

* cited by examiner

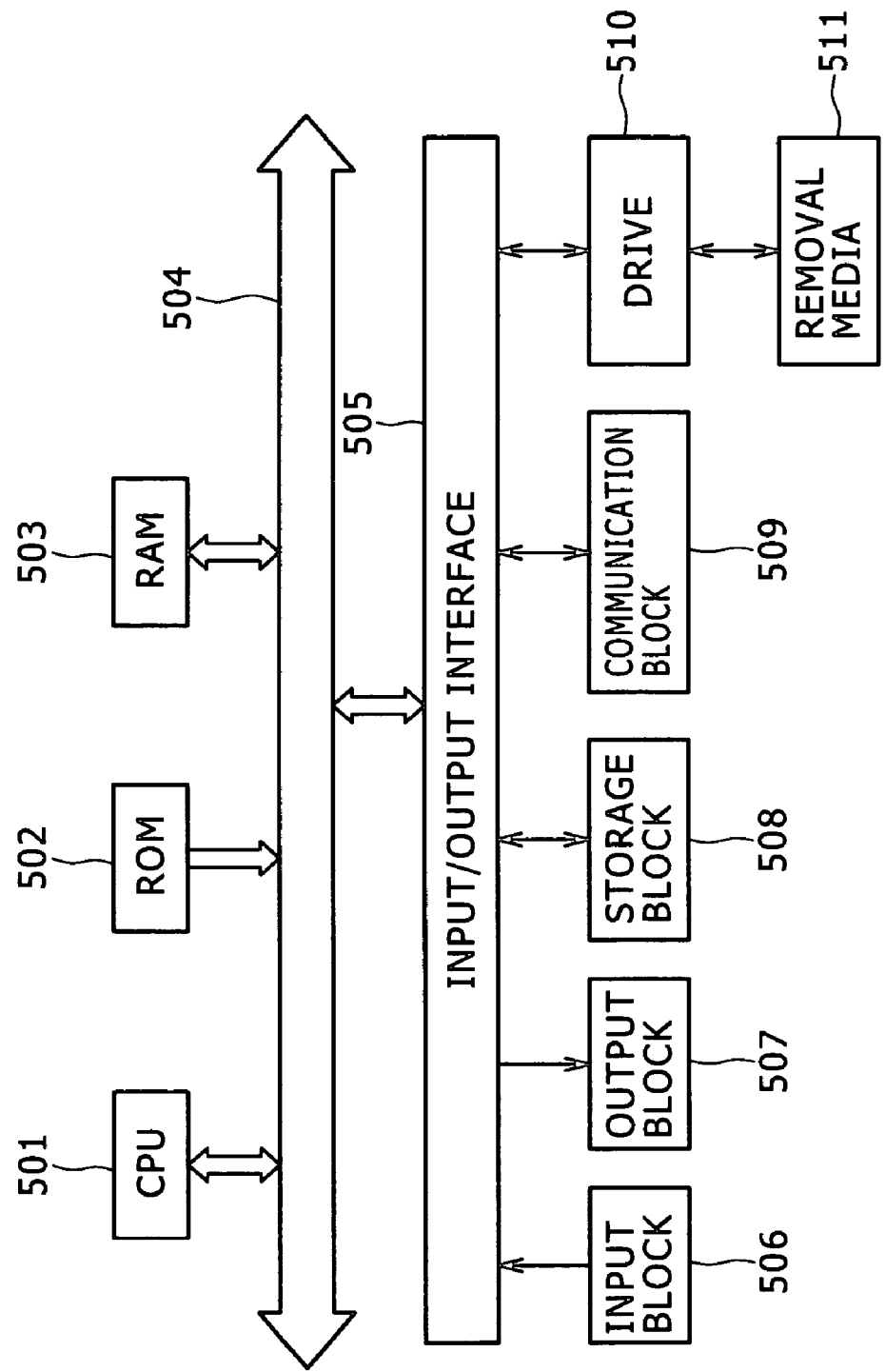

MULTI-SCREEN TELEVISION RECEIVER REMOTE CONTROL SYSTEM, REMOTE CONTROLLER AND OPERATION METHOD, MULTI-SCREEN TELEVISION RECEIVER AND OPERATION METHOD, RECORDING MEDIA, AND PROGRAM

CROSS-REFERENCE TO RELATED APPLICATIONS

The present application claims priority from Japanese Patent Application No. JP 2005-267774 filed on Sep. 15, 2005, the disclosure of which is hereby incorporated by reference herein.

BACKGROUND OF THE INVENTION

1. Field of the Invention

The present invention relates to a multi-screen television receiver remote control system, a remote controller and operation method, a multi-screen television receiver and operation method, a recording media, and a program and, more particularly, to a multi-screen television receiver remote control system, a remote controller and operation method, a multi-screen television receiver and operation method, a recording media, and a program that allow the easy operation of a multi-screen television receiver having a plurality of television receivers by use of a remote controller.

2. Description of the Related Art

Multi-screen television receivers each based on a plurality of television receivers is gaining popularity. For example, a television receiver having a multi-screen capability based on the use of a plurality of television receivers was proposed (refer to Japanese Utility Model Laid-Open No. Hei 5-63163 for example).

However, in multi-screen television receivers such as described above, if capable of selecting of any of the component television receivers, changing display positions and channels for example with a same image displayed on two or more television receivers in a zoom-in manner for example require the arrangement of new controls keys for these operations. Therefore, making multi-functional the display function of the multi-screen television receiver increases the number of control keys by the number of added functions, thereby presenting a problem of complicating the operation of the remote controller by each user.

Therefore, the present invention addresses the above-identified and other problems associated with related-art methods and apparatuses and solves the addressed problems by facilitating the operation of the remote controller without increasing operator keys thereon if multi-screen television receivers each composed of a plurality of television receivers are made multi-functional.

SUMMARY OF THE INVENTION

In carrying out the invention and according to a first embodiment thereof, there is provided a multi-screen television receiver remote control system having a multi-screen television receiver including a plurality of television receivers and a remote controller for controlling the multi-screen television receiver.

The above-mentioned remote controller has determining means for determining an operation status of each of the plurality of television receivers; manipulating means for receiving user operations; remote control command generating means for generating a remote control command to be transmitted to the plurality of television receivers based on the operation status of the television receivers and contents of the user operations; and transmitting means for transmitting the remote control command. The above-mentioned multi-screen television receiver has receiving means for receiving the remote control command from the remote controller; recognizing means for recognizing a status of each of the plurality of television receivers; and executing means for executing predetermined processing for each of the plurality of television receivers based on the recognized status of the television receivers and the remote control command received by the receiving means.

In carrying out the invention and according to a second embodiment thereof, there is provided a remote controller for controlling a multi-screen television receiver including a plurality of television receivers. This remote controller has determining means for determining an operation status of each of the plurality of television receivers; manipulating means for receiving user operations; remote control command generating means for generating a remote control command to be transmitted to the plurality of television receivers based on the operation status of the television receivers and contents of the user operations; and transmitting means for transmitting the remote control command to the multi-screen television receiver.

The above-mentioned remote controller further has status storing means for storing the operation status of each of the plurality of television receivers.

The above-mentioned remote controller still further has receiving means for receiving a television command from the plurality of television receivers, the status storing means storing the operation status of each of the plurality of television receivers based on the television command.

The above-mentioned remote controller yet further has light emitting means for emitting light based on the operation status of each of the plurality of television receivers.

In the above-mentioned remote controller, the remote control command generating means generates, as remote control commands, a command for activating any one of the plurality of television receivers to output audio at least based on the operation status of the television receivers and the contents of the user operations, a command for enlarging an image displayed on the activated television receiver to display the enlarged image on the plurality of television receivers, a command for delaying an image displayed on the activated television receiver by a predetermined time to sequentially display the image on the plurality of television receivers in a flash light display manner, and a command for displaying a menu screen to execute a setting operation.

In the above-mentioned remote controller, the manipulating means is made up of a pressure sensor and the remote control command generating means generates a command to be transmitted to the plurality of television receivers based on the operation status of the television receivers and a result of detection of the pressure sensor.

In carrying out the invention and according to the second embodiment thereof, there is provided a method for controlling a remote controller for controlling a multi-screen television receiver including a plurality of television receivers. This method includes determining an operation status of each of the plurality of television receivers; receiving a user operation; generating a remote control command to be transmitted to the plurality of television receivers based on the operation status of the television receivers and contents of the user operation; and transmitting the remote control command to the multi-screen television receiver.

In carrying out the invention and according to the second embodiment thereof, there is provided a recording medium recorded with a computer-readable program for controlling a remote controller for controlling a multi-screen television receiver including a plurality of television receivers. This computer-readable program includes determining an operation status of each of the plurality of television receivers; receiving a user operation; generating a remote control command to be transmitted to the plurality of television receivers based on the operation status of the television receivers and contents of the user operation; and transmitting the remote control command to the multi-screen television receiver.

In carrying out the invention and according to the second embodiment thereof, there is provided a computer-readable program for making a computer execute a method for controlling a remote controller for controlling a multi-screen television receiver including a plurality of television receivers, the method including determining an operation status of each of the plurality of television receivers; receiving a user operation; generating a remote control command to be transmitted to the plurality of television receivers based on the operation status of the television receivers and contents of the user operation; and transmitting the remote control command to the multi-screen television receiver.

In carrying out the invention and according to a third embodiment thereof, there is provided a multi-screen television receiver including a plurality of television receivers. This multi-screen television receiver includes recognizing means for recognizing an operation status of each of the plurality of television receivers; and executing means for executing predetermined processing for each of the plurality of television receivers based on the recognized operation status of the television receivers and a remote control command.

The above-mentioned multi-screen television receiver further has receiving means for receiving the remote control command.

The above-mentioned multi-screen television receiver still further has transmitting means for transmitting, as a television command, the operation status for each of the plurality of television receivers.

In the above-mentioned multi-screen television receiver, the executing means activates any one of the plurality of television receivers to output audio at least based on the recognized operation status of the television receivers and the remote control command, enlarges an image displayed on the activated television receiver to display the enlarged image on the plurality of television receivers, delays an image displayed on the activated television receiver by a predetermined time to sequentially display the image on the plurality of television receivers in a flash light display manner, and displays a menu screen to execute a setting operation.

In carrying out the invention and according to the third embodiment thereof, there is provided an operating method for a multi-screen television receiver including a plurality of television receivers. This method includes recognizing an operation status of each of the plurality of television receivers; and executing predetermined processing for each of the plurality of television receivers based on the recognized operation status of the television receivers and a remote control command.

In carrying out the invention and according to the third embodiment thereof, there is provided a recording medium recorded with a computer-readable program for controlling a multi-screen television receiver including a plurality of television receivers. This computer-readable program includes recognizing an operation status of each of the plurality of television receivers; and executing predetermined processing for each of the plurality of television receivers based on the recognized operation status of the television receivers and a remote control command.

In carrying out the invention and according to the third embodiment thereof, there is provided a computer-readable program for making a computer execute a method for controlling a multi-screen television receiver including a plurality of television receivers, the method including recognizing an operation status of each of the plurality of television receivers; and executing predetermined processing for each of the plurality of television receivers based on the recognized operation status of the television receivers and a remote control command.

Namely, in the first embodiment of the invention, the above-mentioned remote controller determines the operation status of each of the above-mentioned plurality of television receivers. A user operation is received. On the basis of a decision result and the contents of the user operation, a remote control command for each of the plurality of television receivers is generated. The generated remote control command is transmitted. The above-mentioned multi-screen television receiver receives the remote control command transmitted from the remote controller. The status of each of the plurality of television receives is recognized. On the basis of a recognition result and the received remote control command, predetermined processing is executed.

In the second embodiment of the invention, a remote controller for controlling a multi-screen television receiver including a plurality of television receivers determines the operation status of each of the plurality of television receivers and receives a user operation. On the basis of a decision result and the contents of the user operation, the remote controller generates a remote control command for each of these television receivers and transmits the generated remote control command to the multi-screen television receiver.

In the third embodiment of the invention, a multi-screen television receiver including a plurality of television receivers recognizes the status of each of these television receivers and, on the basis of a recognition result and a remote control command, executes predetermined processing for each of these television receivers.

The multi-screen television receiver and the remote controller may be either separate units or component blocks for executing predetermined processing incorporated in a multi-screen television receiver system made up of the multi-screen television receiver and the remote controller.

As described above and according to the first, second and third embodiments of the invention, each operation of multi-screen television receivers by remote controllers thereof is significantly enhanced.

BRIEF DESCRIPTION OF THE DRAWINGS

FIG. 25 is a block diagram illustrating a recording media.

DETAILED DESCRIPTION

Figure 1:
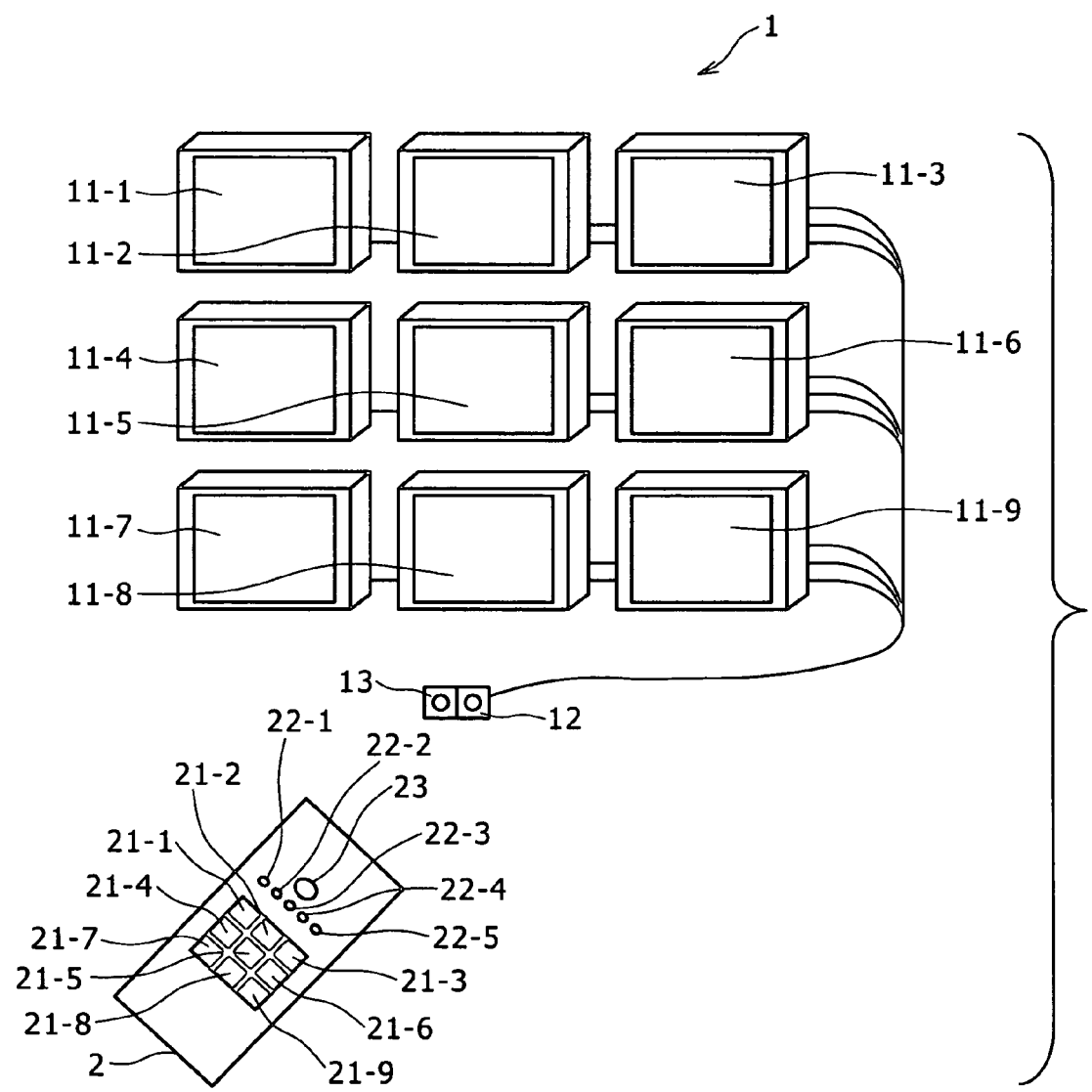
FIG. 1 is a schematic diagram illustrating an exemplary configuration of a multi-screen television receiver remote control system practiced as one embodiment of the invention.

This invention will be described in further detail by way of embodiments thereof with reference to the accompanying drawings. The invention described herein and the embodiments thereof have the following correlation. The description hereof is intended to make sure of the fact that the embodiments supporting the invention described herein are described herein. Therefore, if there is any embodiment that, although described in the description of the preferred embodiment, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

Namely, a multi-screen television receiver remote control system has a multi-screen television receiver made up of a plurality of television receivers and a remote controller for controlling the multi-screen television receiver.

The above-mentioned remote controller may have determining means (for example, a reception control block 105 shown in FIG. 6) for determining an operation status of each of the plurality of television receivers; manipulating means (for example, an input control block 101 shown in FIG. 6) for receiving a user operation; remote control command generating means (for example, a generation block 103 shown in FIG. 6) for generating a remote control command to be transmitted to the plurality of television receivers on the basis of a determination result provided by the determining means and a content of the operation received by the manipulating means; and transmitting means (for example, a transmission control block 104 shown in FIG. 6) for transmitting the remote control command generated by the remote control command generating means. The above-mentioned multi-screen television receiver has receiving means (a reception processing signal 68 shown in FIG. 4) for receiving the remote control command from the remote controller; recognizing means (a receive command recognition block 81 shown in FIG. 5) for recognizing a status of each of the plurality of television receiver; and executing means (for example, an image conversion block 85, an audio generation block 87, or a menu screen generation block 90 shown in FIG. 5) for executing predetermined processing for each of the plurality of television receivers on the basis of a result of recognition provided by the recognizing means and the remote control command received by the receiving means.

The remote controller of the second embodiment of the invention controls a multi-screen television receiver made up of a plurality of television receivers. This remote controller may have determining means (for example, a decision block 102 shown in FIG. 6) for determining an operation status of each of the plurality of television receivers; manipulating means (for example, an input control block 101 shown in FIG. 6) for receiving a user operation; remote control command generating means (for example, a generation block 103 shown in FIG. 6) for generating a remote control command to be transmitted to the plurality of television receivers on the basis of a determination result provided by the determining means and a content of the operation received by the manipulating means; and transmitting means (a transmission control block 104 shown in FIG. 6) for transmitting the remote control command generated by the remote control command generating means.

The above-mentioned remote controller further may have status storing means (for example, a storage block 106 shown in FIG. 6) for storing an operation status of each of the plurality of television receivers.

The above-mentioned remote controller still further may have receiving means (for example, a reception processing signal 68 shown in FIG. 4) for receiving a television command from the plurality of television receivers, the status storing means (for example, a storage block 106 shown in FIG. 6) for storing an operation status of each of the plurality of television receivers on the basis of the television command received by the receiving means.

The above-mentioned remote controller yet further may have light emitting means (for example, a LED 69 shown in FIG. 4) for emitting light on the basis of an operation status of each of the plurality of television receivers.

In the above-mentioned remote controller, the remote control command generating means may generate, as remote control commands, a command for activating any one of the plurality of television receivers to output audio at least on the basis of a result of determination provided by the determining means and contents of operation done through the manipulating means, a command for enlarging an image displayed on the activated television receiver among the plurality of television receivers to display the enlarged image on the plurality of television receivers, a command for delaying an image displayed on the activated television receiver among the plurality of television receivers by a predetermined time to sequentially display the image on the plurality of television receivers in a flash light display manner, and a command for displaying a menu screen to execute a setting operation.

In the above-mentioned remote controller, the manipulating means may be made up of a pressure sensor and the remote control command generating means generates a command to be transmitted to the plurality of television receivers on the basis of a result of determination provided by the determining means and a result of detection of a pressure sensor forming the manipulating means.

The remote controller operating method and computer-readable program of the second embodiment of the invention controls a remote controller for controlling a multi-screen television receiver made up of a plurality of television receivers. These method and computer-readable may be each made up of steps of determining an operation status of each of the plurality of television receivers (for example, step S3 shown in FIG. 7); receiving a user operation (for example, step S1 shown in FIG. 7); generating a remote control command to be transmitted to the plurality of television receivers on the basis of a determination result provided by the determining step and contents of an operation done in the receiving step (for example, step S4 shown in FIG. 7); and transmitting the remote control command generated in the remote control command generating step (for example, step S5 shown in FIG. 7).

The multi-screen television receiver of the third embodiment of the invention is made up of a plurality of television receivers. This multi-screen television receiver may have recognizing means (for example, a receive command recognition block 81 shown in FIG. 5) for recognizing an operation status of each of the plurality of television receivers and executing means (for example, an image conversion block 85, an audio generation block 87, or a menu screen generation block 90 shown in FIG. 5) for executing predetermined processing for each of the plurality of television receivers on the basis of a result of recognition provided by the recognizing means and a remote control command.

The above-mentioned multi-screen television receiver further may have receiving means (for example, a reception processing block 31 shown in FIG. 2) for receiving a remote control command.

The above-mentioned multi-screen television receiver still further may have transmitting means (for example, a send command generation block 93 shown in FIG. 5) for transmitting, as a television command, the operation status recognized by the recognizing means for each of the plurality of television receivers.

In the above-mentioned multi-screen television receiver, the executing means may activate any one of the plurality of television receivers to output audio at least on the basis of a result of recognition provided by the recognizing means and a remote control command, enlarge an image displayed on the activated television receiver to display the enlarged image on the plurality of television receivers, delay an image displayed on the activated television receiver by a predetermined time to sequentially display the image on the plurality of television receivers in a flash light display manner, and display a menu screen to execute a setting operation.

The operating method and computer-readable program of the third embodiment of the invention are for a multi-screen television receiver made up of a plurality of television receivers. These method and computer-readable program may be each made up of the steps of recognizing an operation status of each of the plurality of television receivers (for example, step S61 shown in FIG. 12) and executing predetermined processing for each of the plurality of television receivers on the basis of a result of recognition provided in the recognizing step and a remote control command (for example, steps S63 and S65 shown in FIG. 12).

Now, referring to FIG. 1, there is illustrated a multi-screen television receiver remote control system practiced as one embodiment of the invention, the system having a multi-screen television receiver 1 and a remote controller 2.

The multi-screen television receiver 1 is composed of a plurality of television receivers 11-1 through 11-9 and capable of, on the basis of commands given by the remote controller 2, displaying different television programs on the plurality of television receivers 11-1 through 11-9, one television program on the plurality of television receivers 11-1 through 11-9 as a zoom-in screen, or one program on the plurality of television receivers 11-1 through 11-9 in a predetermined delay timed relation in a flash light manner. It should be noted that, if there is no need for making a distinction between the plurality of television receivers 11-1 through 11-9, they are hereafter generically referred to as a television receiver 11; the same holds with other configurations of the invention. With reference to FIG. 1, an example is used in which the multi-screen television receiver 1 is composed of three television receivers 11 arranged in the horizontal direction and three television receivers 11 arranged in the vertical direction, amounting to a total of nine television receivers 11. It will be apparent to those skilled in the art that the number of television receivers 11 may be other than nine. Also, the matrix of television receivers 11 may be other than 3×3.

The television receiver 11 has a tuner and therefore -is capable of functioning as a general-use individual television receiver.

The multi-screen television receiver 1 has a light reception block 12 for receiving an optical signal indicative of a command given by the remote controller 2. Also the multi-screen television receiver 1 emits, to the remote controller 2, a predetermined optical signal indicative of a command corresponding to a status of the multi-screen television receiver 1, the optical signal being generated by each television receiver 11.

The remote controller 2 has nine select keys 21-1 through 21-9 each made up of a pressure sensor, which correspond to the television receivers 11. The remote controller 2 also has five function keys 22-1 through 22-5 for switching between functions of the multi-screen television receiver 1, such as the above-mentioned zoom-in and flash light display modes. In addition, the remote controller 2 has a home key 23 for selecting the basic status among the above-mentioned functions. The functions include basis status, zoom-in display status, flash light display status, and menu display status. In what follows, the description will be made by use of an example in which pressing the function key 22-1 switches the status to zoom-in display, pressing the function key 22-2 switches the status to flash light display, pressing the function key 22-3 switches the status to menu display, and pressing the home key 23 calls the basic status. Instead, these switching operations may be realized by other function keys 22 or other functions may be allocated to function keys 22-4 and 22-5 that are currently in the reserved status.

The basic status denotes a status in which the television receivers 11-1 through 11-9 are displaying different channels and only the audio of a channel set to the television receiver 11 activated by the select key 21.

The zoom-in display status denotes a status in which an image actively set on any one of the television receivers 11-1 through 11-9 is displayed on all of the television receivers 11-1 through 11-9 as one whole image.

The flash light display status denotes a status in which an image actively set to any one of the television receivers 11-1 through 11-9 is sequentially displayed on each of the television receivers 11-1 through 11-9 with a predetermined delay time.

The menu display status denotes a status in which menu screens for each television receiver 11 to set a channel to be set and sound quality and image quality to be set, for example, are displayed.

In addition, as will be described later, the remote controller 2 has a light emitting block 66 (FIG. 4) for giving commands in the form of optical signals to the multi-screen television receiver 1 and a light reception block 67 (FIG. 4) for receiving the commands from the multi-screen television receiver 1.

Figure 2:
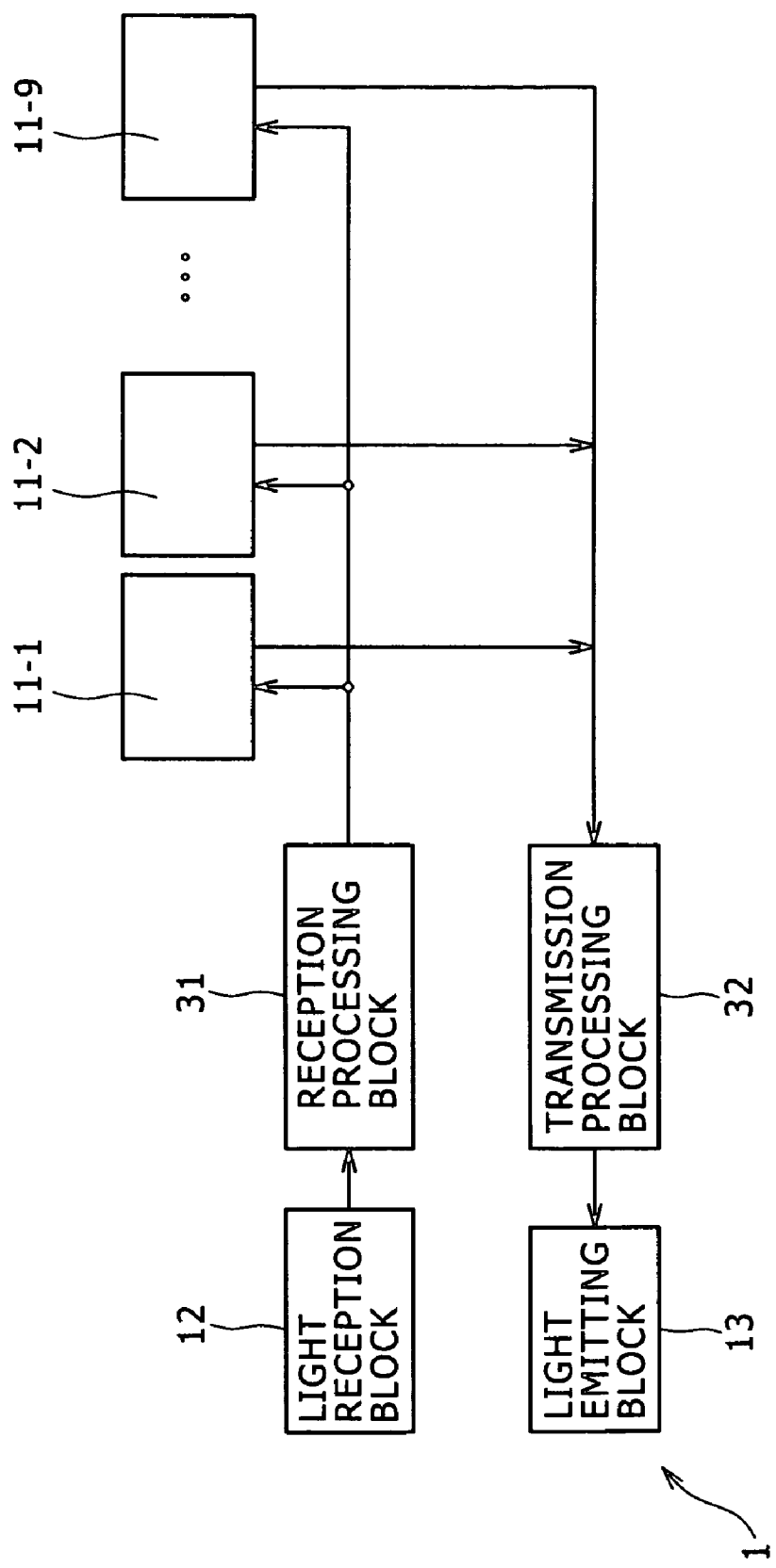
FIG. 2 is a block diagram illustrating an exemplary hardware configuration of the a multi-screen television receiver shown in FIG. 1 practiced as another embodiment of the invention.

The following describes an exemplary hardware configuration of the multi-screen television receiver 1 practiced as one embodiment of the invention with reference to FIG. 2.

A reception processing block 31 of the multi-screen television receiver 1 receives an optical signal from the remote controller 2 and converts the received optical signal into an electrical signal, supplying the electrical signal to each television receiver 11 as a command. Therefore, every command given from the remote controller 2 is supplied to all television receivers 11-1 through 11-9.

A transmission processing block 32 converts a command supplied from each of the television receivers 11-1 through 11-9 into an optical signal to turn on an light emitting block 13.

Figure 3:
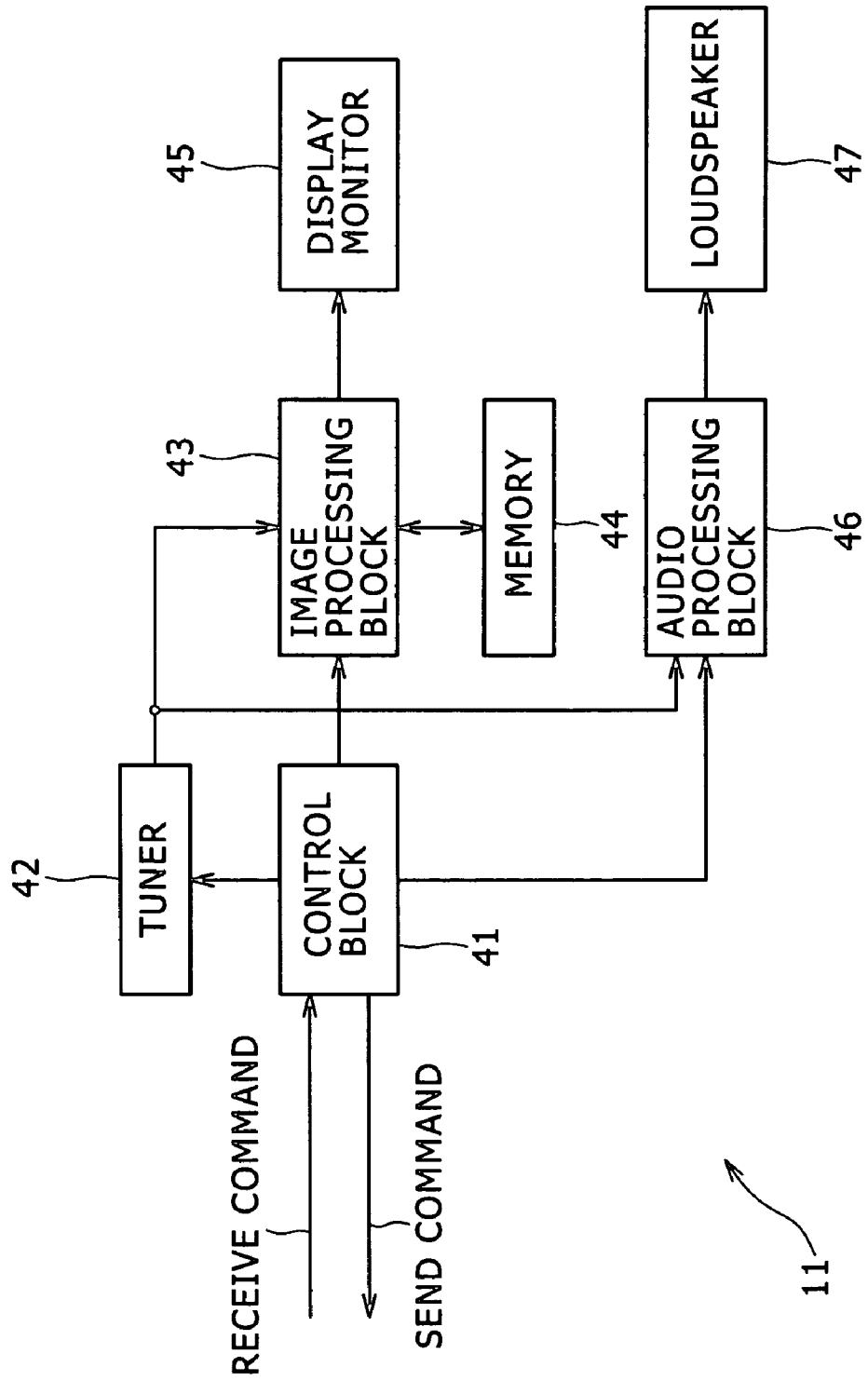
FIG. 3 is a block diagram illustrating an exemplary hardware configuration of a television receiver shown in FIG. 1 practiced as still another embodiment of the invention.

The following describes an exemplary hardware configuration of the television receiver 11 practiced as one embodiment of the invention with reference to FIG. 3.

A control block 41, configured by a so-called microcomputer for example, controls the entire operation of the television receiver 11, more particularly, a tuner 42, an image processing block 43, and an audio processing block 46 on the basis of commands issued from the reception processing block 31. The tuner 42, under the control of the control block 41, demodulates broadcast signals of a particular broadcast station supplied from an antenna, not shown, supplies a resultant image signal to the image processing block 43 and a resultant audio signal to the audio processing block 46.

The image processing block 43, under the control of the control block 41, converts an image signal supplied from the tuner 42 into a signal that is displayable on a display monitor 45 while appropriately using a memory 44 as required, thereby displaying the displayable signal. The audio processing block 46, under the control of the control block 41, D/A (Digital to Analog) converts an audio signal supplied from the tuner 42 to sound the converted signal from a loudspeaker 47.

Figure 4:
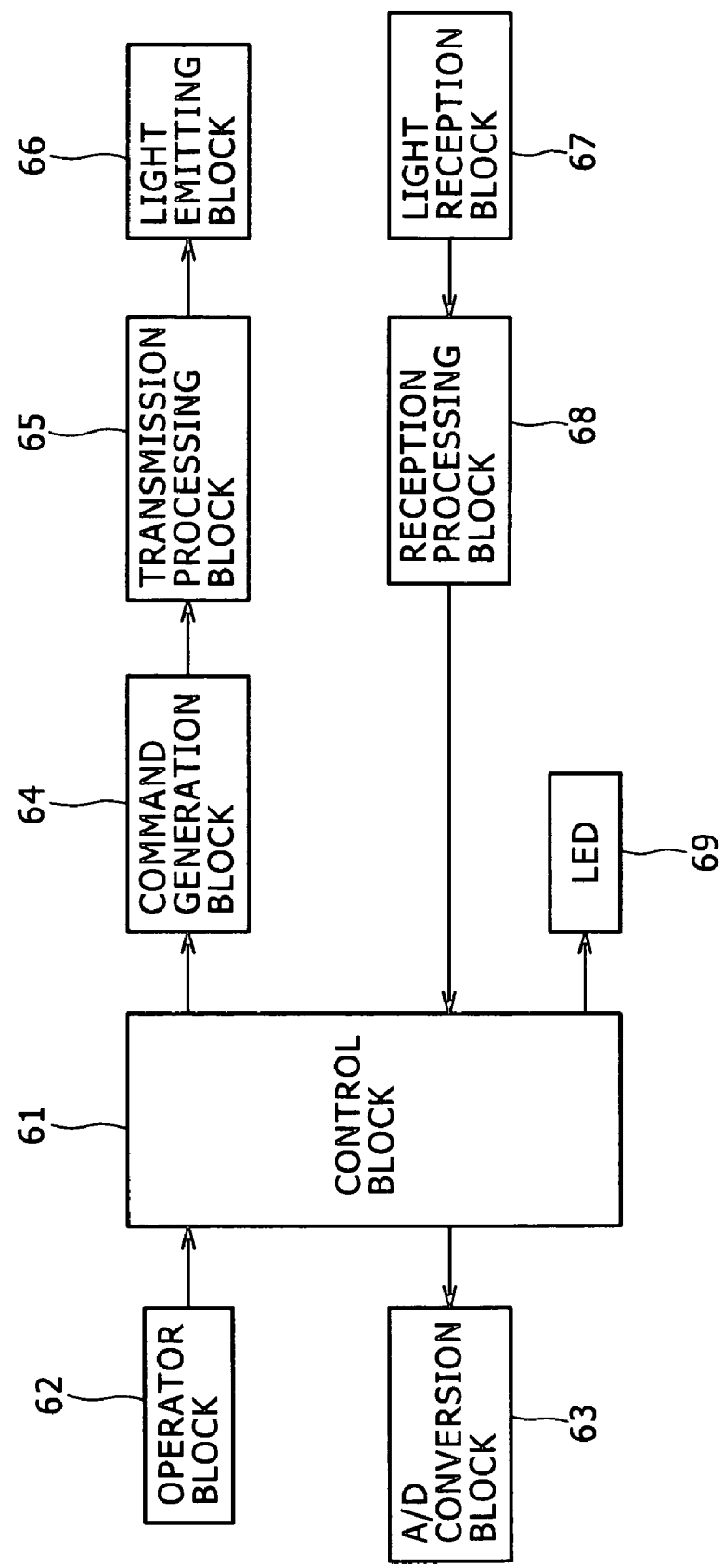
FIG. 4 is a block diagram illustrating an exemplary hardware configuration of a remote controller shown in FIG. 1 practiced as yet another embodiment of the invention.

The following describes an exemplary hardware configuration of the remote controller 2 practiced as one embodiment of the invention with reference to FIG. 4.

A control block 61, configured by a so-called microcomputer for example, controls the entire operation of the remote controller 2. The control block 61 gives a command for a corresponding television receiver 11 to a command generation block 64 on the basis of a signal of the television receiver 11 supplied from a reception processing block 68 and a signal supplied through an A/D (Analog to Digital) conversion block 63 based on an operation signal issued from an operator block 62 configured by pressure sensors.

A command generation block 64 generates commands recognizable by the television receiver 11 of the multi-screen television receiver 1 on the basis of commands issued by the control block 61 and supplies the generated commands to a transmission processing block 65. The transmission processing block 65 converts each signal supplied from the command generation block 64 into an optical signal to turn on the light emitting block 13.

If an optical signal emitted by the light emitting block 13 of the multi-screen television receiver 1 is received by the light reception block 67, the reception processing block 68 restores the command to the original form thereof and supplies the original command to the control block 61. A LED (Light Emitting Diode) 69, incorporated in each select key 21, is controlled by the control block 61 to light each select key 21 with a predetermined pattern on the basis of an operation status of the television receiver 11 at that moment.

Figure 5:
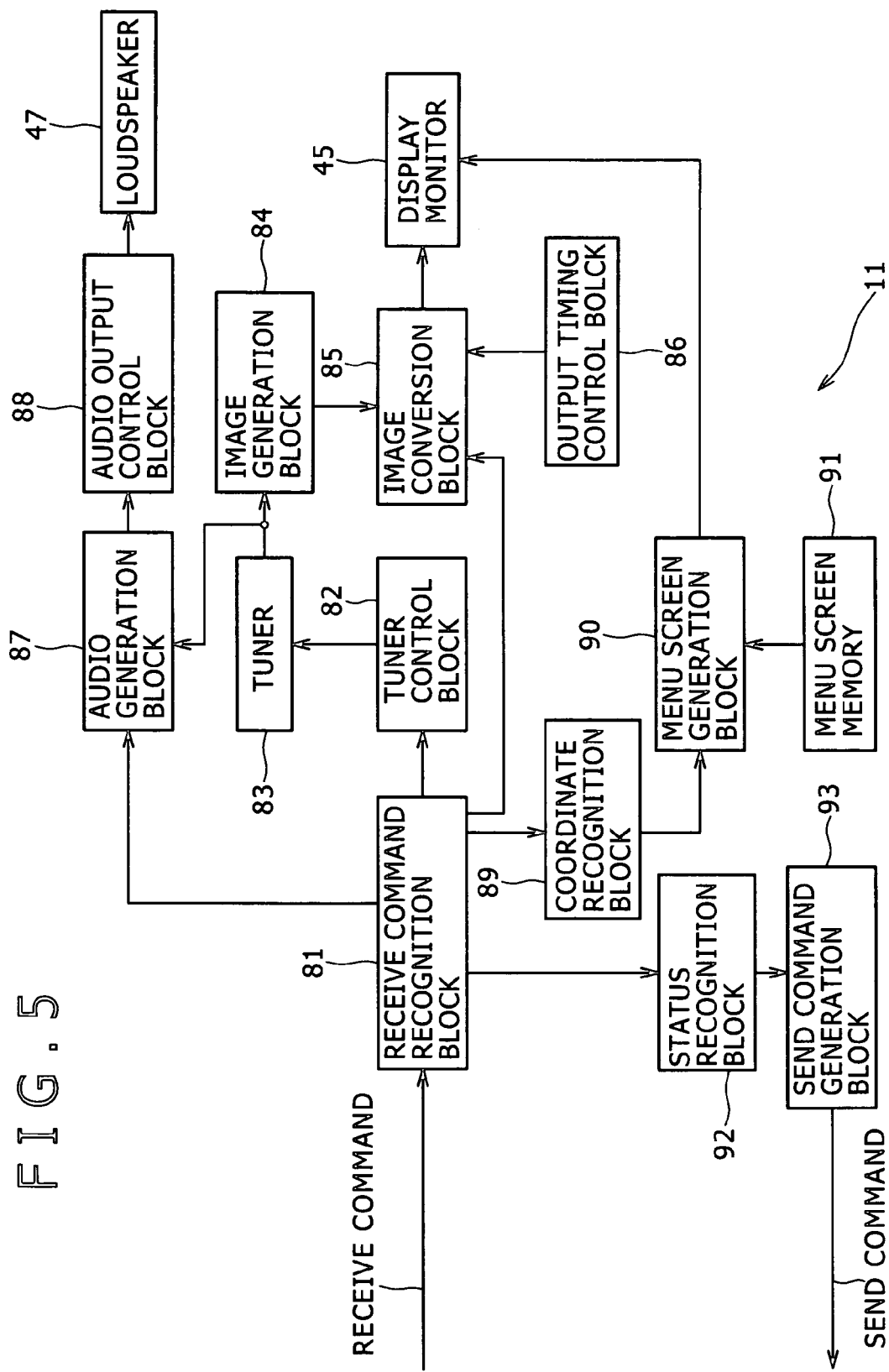
FIG. 5 is a block diagram illustrating an exemplary configuration of a function practiced as a different embodiment of the invention, which is realized by the television receiver shown in FIG. 3.

The following describes embodiments of functions to be implemented by the television receiver 11 shown in FIG. 3 with reference to FIG. 5.

A receive command recognition block 81 recognizes a command issued by the remote controller 2 to control a tuner control block 82, an image conversion block 85, an audio generation block 87, a coordinate recognition block 89, and a status recognition block 92.

The tuner control block 82 controls the tuner 83 on the basis of a channel select signal supplied from the receive command recognition block 81 to a selected channel to receive a corresponding broadcast signal from an antenna, not shown, supplying the received broadcast signal to an image generation block 84 and an audio generation block 87. The image generation block 84 generates an image signal displayable on the display monitor from a broadcast signal supplied from the tuner 83 and supplies the generated image signal to the image conversion block 85. The image conversion block 85 not only displays the image signal supplied from the image generation block 84 onto the display monitor 45 without change, but also displays, on the display monitor 45, the image signal in a zoom-in manner with a predetermined zoom ratio on the basis of a command supplied from the receive command recognition block 81 or in a flash light manner with a predetermined delay on the basis of a timing signal supplied from an output timing control block 86, for example.

The audio generation block 87 generates an audio signal from a broadcast signal supplied from the tuner 83 and supplies the generated audio signal to an audio output control block 88. The audio output control block 88 amplifies the audio signal with a predetermined amplification ratio to sound the amplified signal from the loudspeaker 47.

The coordinate recognition block 89 recognizes a cursor coordinate position on the basis of the information of a command supplied from the receive command recognition block 81 and supplies the recognized cursor coordinate position to a menu screen generation block 90. The menu screen generation block 90 reads menu screen information from a menu screen memory 91 on the basis of the coordinate information supplied from the coordinate recognition block 89 to display a menu screen on the display monitor 45.

A status recognition block 92 recognizes a status of the television receiver 11 in accordance with the contents of a command supplied by the receive command recognition block 81 for each configuration and supplies a recognition result to a send command generation block 93. The send command generation block 93 generates a command indicative of an operation status of the television receiver 11 and supplies the generated send command to the remote controller 2.

Figure 6:
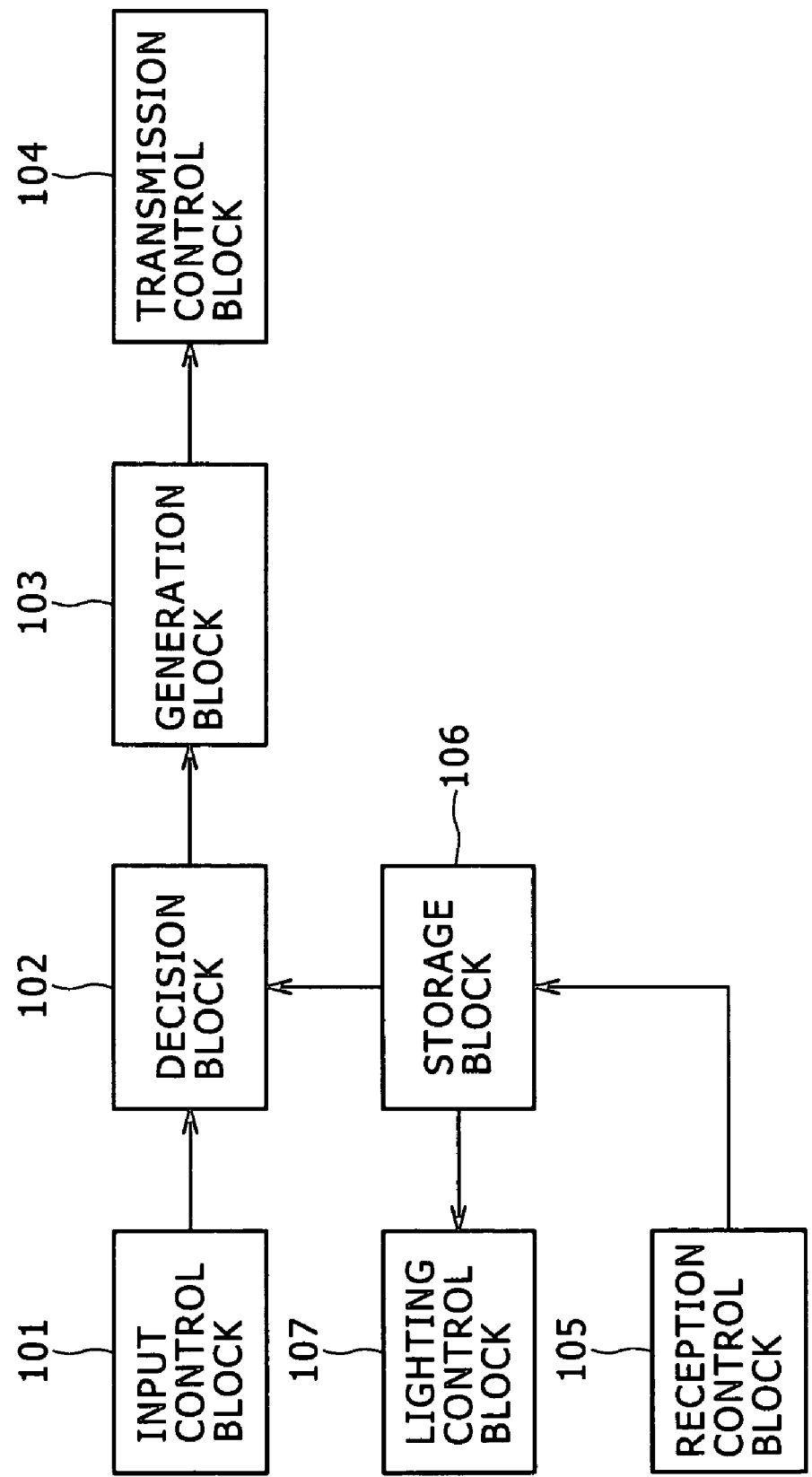
FIG. 6 is a block diagram illustrating an exemplary configuration of a function to be realized by the remote controller shown in FIG. 4, which is practiced as a still different embodiment of the invention.

The following describes an exemplary configuration of embodiments of functions to be implemented by the remote controller 2 shown in FIG. 4 with reference to FIG. 6.

An input control block 101 recognizes the contents of an operation done by the user of the remote controller 2 from a signal supplied from the A/D conversion block 63 based on the a detection result from the operator block 62 based on pressure sensors and supplies the recognized operation to a decision block 102. On the basis of the information about an operation status of each television receiver 11 of the multi-screen television receiver 1 stored in a storage block 106, the decision block 102 determines the contents of an operation done by the user and supplies a decision result to a generation block 103. The generation block 103 generates a command for each television receiver 11 of the multi-screen television receiver 1 on the basis of the decision result from the decision block 102 and supplies the generated command to the a transmission control block 104. On the basis of the command generated by the generation block 103, the transmission control block 104 controls the light emitting block 66 to transmit the command to the television receiver 11 as an optical signal.

A reception control block 105 receives an optical signal indicative of a command supplied from the light emitting block 13 of the multi-screen television receiver 1 and recognizes an operation status of the television receiver 11 on the basis of the command, storing the recognized operation status into the storage block 106. An operation status denotes one of the above-mentioned basic status, zoom-in display status, flash light display status, and menu display status. A lighting control block 107 turns on an LED 69 on the basis of the information about the operation status of the television receiver 11 stored in the storage block 106.

Figure 7:
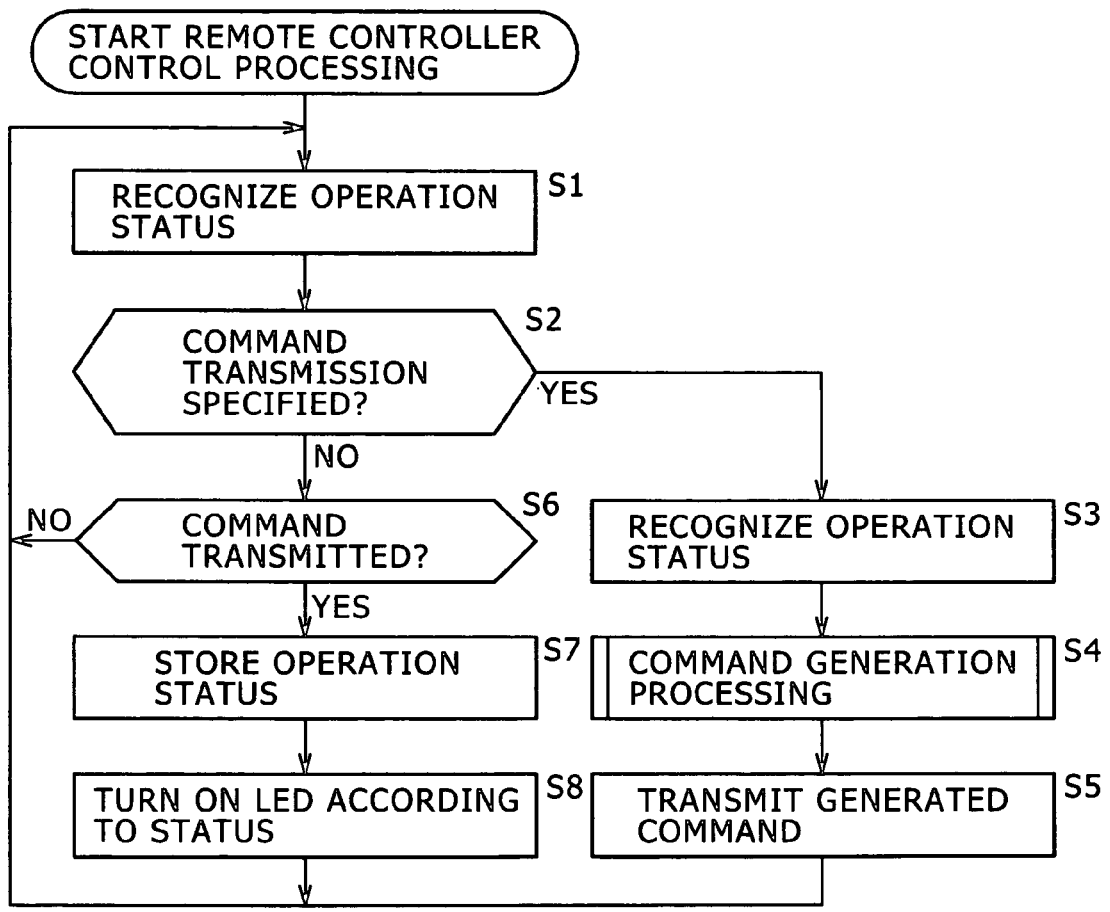
FIG. 7 is a flowchart indicative of remote controller control processing.

The following describes remote controller control processing with reference to the flowchart shown in FIG. 7.

In step S1, the decision block 102 recognizes an operation done by the user on the basis of a signal obtained by A/D-converting a signal from the operator block 62 made up of pressure sensors by the A/D conversion block 63 supplied from the input control block 101. Namely, the input control block 101 recognizes the pressing status of the select key 21, the function key 22, and the home key 23 of the operator block 62 arranged on the remote controller 2 and supplies a recognition result to the decision block 102. On the basis of the received recognition result, the decision block 102 recognizes the user operation status of the select key 21, the function key 22, and home key 23.

In step S2, the decision block 102 determines on the basis of the operation status of the operator block 62 recognized by the input control block 101 whether the command transmission has been specified by the user, namely, the select key 21, the function key 22, and the home key 23 have been actually pressed by the user to specify the transmission of a corresponding command.

If the command transmission of any of the corresponding commands is found specified in step S2, then the decision block 102 recognizes the operation status of the active television receiver 11 stored in the storage block 106, namely, whether the active television receiver 11 is in one of the basic status, the zoom-in display status, the flash light display status, and the menu display status, in step S3. It should be noted that, in the multi-screen television receiver 1, the plurality of television receiver 11 are set to the basic status as default in which each television receiver 11 displays the image of a different channel, so that, if no information comes from the multi-screen television receiver 1, the information that the television receiver 11-1 of the multi-screen television receiver 1 is active and the operation status is the basic status is stored in the storage block 106.

In step S4, command generation processing is executed to generate a command to be supplied to the multi-screen television receiver 1.

Figure 8:
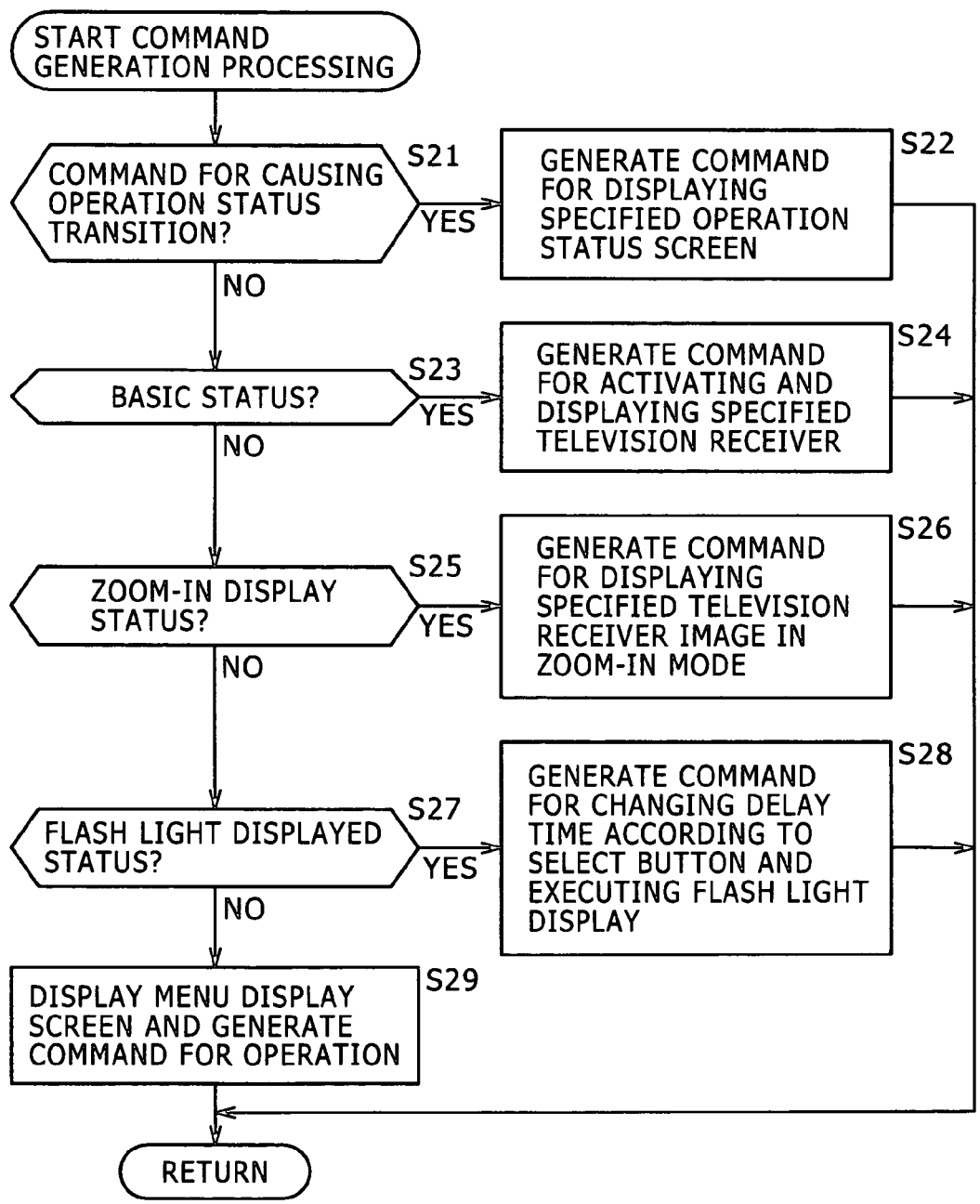
FIG. 8 is a flowchart indicative of command generation processing.

The following describes the command generation processing with reference to the flowchart shown in FIG. 8.

In step S21, the decision block 102 determines on the basis of the information supplied from the input control block 101 whether a command for changing the operation statuses has been entered.

Figure 9:
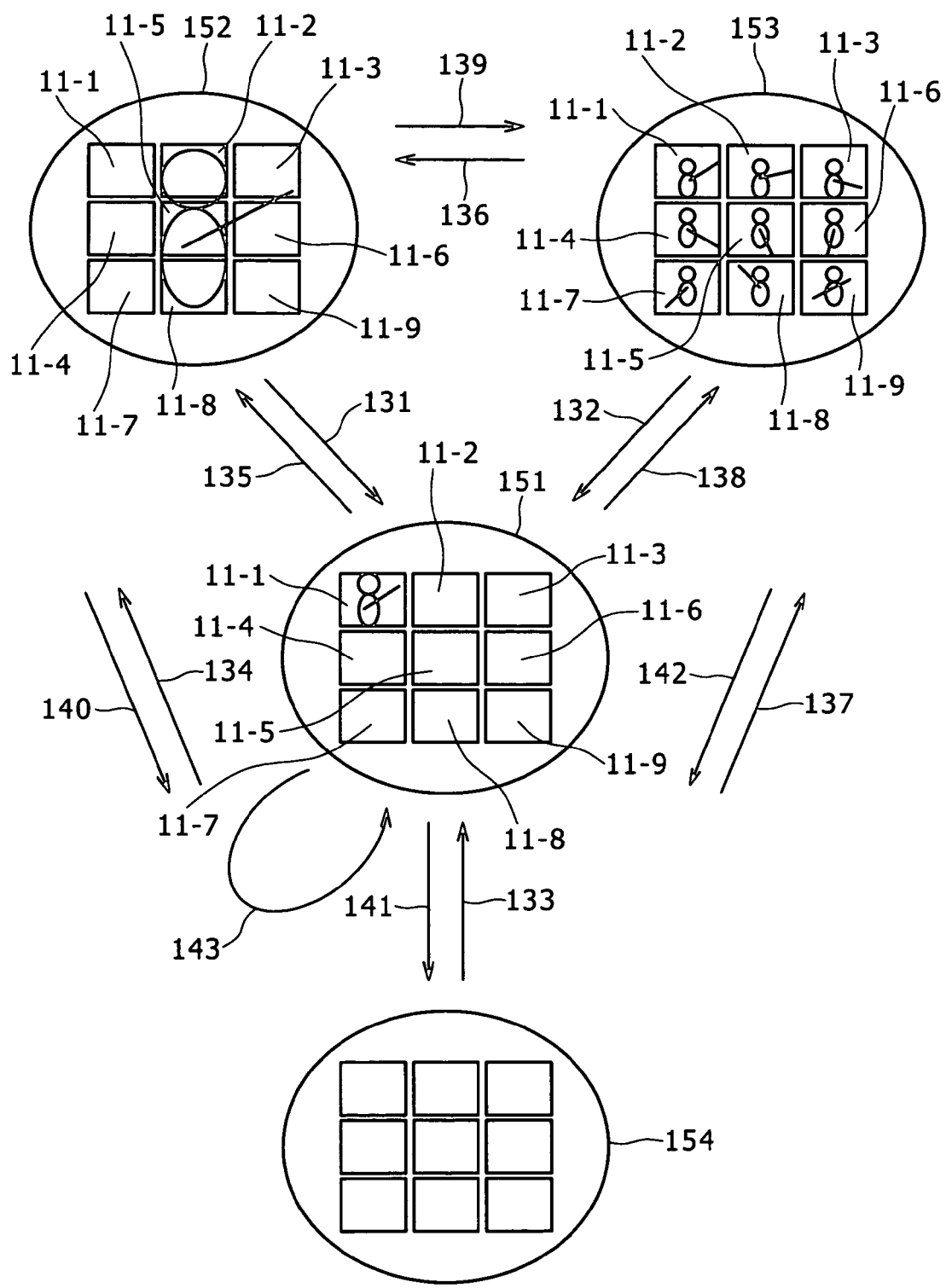
FIG. 9 is a diagram illustrating operation status transitions.
Figure 10:
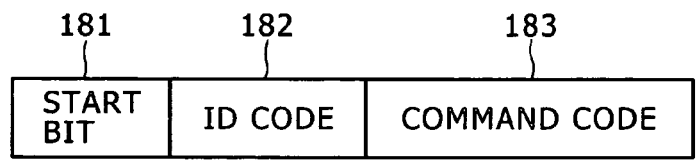
FIG. 10 is a diagram illustrating an exemplary configuration of a command to be transmitted from a remote controller shown in FIG. 1.

The operation statuses are changed as shown in FIG. 9, for example. Referring to FIG. 9, basis status 151, zoom-in display status 152, flash light display status 153, and menu display status 154 are shown as the operation statuses and the directions of transition of the operation statuses are indicated by status transitions 131 through 143.

In default, the operation status is basic status 151 shown at the center of the figure, in which the television receivers 11-1 through 11-9 are displaying different channels and audio of the television receiver 11-1 that is active in default is being outputted.

In causing a status transition from basic status 151 to zoom-in display status 152, for example, if the function key 22-1 is pressed simultaneously with one of the select keys 21-1 through 21-9 or only the function key 22-1 is pressed, status transition 135 is caused to display the channel corresponding to the select key 21 or the channel of the active television receiver 11 on all television receivers 11-1 through 11-9 in a zoom-in manner. In zoom-in display status 152 shown in FIG. 9, an example in which the select key 21-1 and the function key 22-1 are pressed at the same time is shown.

In causing a status transition from flash light display status 153 or menu display status 154 other than basic status 151 to zoom-in display status 152, if only the function key 22-1 is pressed, status transition 136 is caused from flash light display status 153 or status transition 134 is caused from menu display status 154; in this case, the channel is the channel of television receiver 11 selected so far, namely, set to the active status.

In causing a status transition from basic status 151 to flash light display status 153, if one of the select keys 21-1 through 21-9 and the function key 22-2 are pressed at the same time, status transition 138 is caused to sequentially display the channel corresponding to the pressed select key 21 on all of the television receivers 11-1 through 11-9 with a predetermined delay time. In the flash light display status 153 shown in FIG. 9, an example in which the select key 21-1 and the function key 22-2 are pressed at the same time is shown.

Further, in causing a status transition to flash light display status 153 from zoom-in display status 152 or menu display status 154 other than basic status 151, if only the function key 22-2 is pressed, status transition 139 is caused from zoom-in display status 152 or status transition 137 is caused from menu display status 154; in this case, the channel is the channel of television receiver 11 selected so far, namely, set to the active status.

In causing a status transition from basic status 151 to menu display status 154, if one of the select keys 21-1 through 21-9 and the function key 22-3 are pressed at the same time, status transition 141 is caused to display a menu screen of the television receiver 11 corresponding to the pressed select key 21 on the display monitors 45 of all television receiver 11-1 through 11-9. In menu display status shown in FIG. 9, an example in which the select key 21-1 and the function key 22-3 are pressed at the same time is shown.

Still further, in causing a status transition to menu display status 154 from zoom-in display status 152 or flash light display status 153 other than basic status 151, if only the function key 22-3 is pressed, status transition 140 is caused from zoom-in display status 152 or status transition 142 is caused from flash light display status 153; in this case, the menu screen is for setting the television receiver 11 selected so far, namely, set to the active status.

Yet further, in causing a status transition to basic status 151 from zoom-in display status 152, flash light display status 153, or menu display status 154, if one of the select keys 21-1 through 21-9 and the home key 23 are pressed at the same time or only the home key 23 is pressed, status transitions 131 through 133 are caused to output the audio of the channel of the television receiver 11 corresponding to the pressed select key 21 or the channel of the television receiver 11 set to the active status so far.

In addition, if only one of the select keys 21-1 through 21-9 corresponding to the television receiver 11 not in the active status is pressed in basic status 151, status transition 143 is caused to return to basic status 151, upon which a new television receiver 11 is activated.

Consequently, in step S21, if only one of the function keys 22 or the home key 23 is pressed or if one of the select keys 21 and one of the function keys 22 are pressed at the same time, the decision block 102 determines that a command for causing an operation status transition has been specified, thereby directing the generation block 103 to issue the command for causing an operation status transition.

In step S22, the generation block 103 generates the specified command for causing a status transition and supplies the generated command to the transmission control block 104.

If the command for causing an operation status transition is found not specified in step S21, then the decision block 102 determines in step S23 whether the current operation status is basic status.

If the current status is found to be basic status in step S23, namely, if the current status is basic status and only one of, the select keys 21-1 through 21-9 is found pressed, then the decision block 102 sets the television receiver 11 selected by one of the select keys 21-1 through 21-9 to the active status in step S24 and makes the generation block 103 generate a command for outputting the audio of only the active television receiver 11. At this time, the generation block 103 activates the television receiver 11 selected by the select key 21, generates a command for outputting audio, and supplies the generated command to the transmission control block 104.

If the current status is not found to be basic status in step S23, then the decision block 102 determines whether the current operation status is zoom-in display status in step S25.

If the current operation status is found to be zoom-in display status in step S25, namely, the current status is zoom-in display status and only one of the select keys 21-1 through 21-9 has been pressed, then the decision block 102 makes, in step S26, the generation block 103 generate a command for displaying a zoom-in image displayed on the television receiver 11 selected by one of the select keys 21-1 through 21-9 onto all of the television receivers 11-1 through 11-9 as one zoom-in image. At this time, the generation block 103 generates the command for displaying the zoom-in image displayed on the television receiver 11 selected by one of the select keys 21-1 through 21-9 onto all of the television receivers 11-1 through 11-9 in further zoom-in and supplies the generated command to the transmission control block 104.

If the current status is found not to be zoom-in display status in step S25, then the decision block 102 determines whether the current operation status is flash light display status.

If the current operation status is flash light display status in step S27, namely, if the current status is flash light display status and only one of the select keys 21-1 through 21-9 has been pressed, then the decision block 102 makes, in step S28, the generation block 103 generate a command for executing a flash light display operation in which delay times are changed in accordance with the select keys 21-1 through 21-9. At this time, the generation block 103 generates the command for executing a flash light display operation in which delay times are changed in accordance with the select keys 21-1 through 21-9 and supplies the generated command to the transmission control block 104.

To be more specific, in a flash light display operation, the television receiver 11-1 first displays a still image of a predetermined channel, followed by the displaying of a still image of a predetermined channel by the television receiver 11-2 with a predetermined delay, followed by the displaying of a still image of a predetermined channel by the television receiver 11-3 with a predetermined delay, and so on sequentially. When the television receiver 11-9 displays a still image of a predetermined channel and a predetermined time passes, this sequence returns to the television receiver 11-1 to repeat the above-mentioned display operation.

In this example, flash light display intervals are set in accordance with the select keys 21; to be more specific, one second for the select key 21-1, two seconds for select key 21-2, three seconds for select key 21-3, and so on. Thus, the display timings in flash light display status are changed.

If the current status is found not to be flash light display status in step S27, namely, if the current status is none of basic status, zoom-in display status, and flash light status, the current status is found to be menu display status, upon which the procedure goes to step S29.

In step S29, the decision block 102 makes the generation block 103 generate a command for moving the cursor in the menu screen in accordance with the select keys 21-1 through 21-9. At the same time, the generation block 103 generates the command for moving the cursor in the menu screen in accordance with the select keys 21-1 through 21-9 and supplies the generated command to the transmission control block 104.

The above-mentioned processing allows the generation of different commands in accordance with operation statuses only by operating the same select key 21-1 through 21-9 without executing a key switching operation in accordance with operation statuses based on the select keys 21-1 through 21-9, so that the multi-screen television receiver having a plurality of functions can be operated with ease without adding operator keys for the operations corresponding to added operation statuses.

The following describes remote controller control processing with reference to the flowchart shown in FIG. 7.

In step S5, the transmission control block 104 turns on the light emitting block 66 to transmit, as an optical signal, the command generated in step S4 to the multi-screen television receiver 1. Each command supplied from the remote controller 2 is similar in configuration to each command supplied from the television receiver 11 to be described later; for example, each command is configured, from the beginning, by a start bit 181, an identification code 182, and a command code 183. The start bit 181 is indicative of the start position of data. The identification code 182 identifies the remote controller 2 or the television receiver 11. The command code 183 identifies a command for actually requesting the television receiver 11 for execution in the case of a command that is transmitted from the remote controller 2 and identifies a command for indicative of an operation status of the television receiver 11 in the case of a command that is transmitted from the television receiver 11.

On the other hand, if the transmission of command is found not specified in step S2, then the reception control block 105 controls, in step S6, the light reception block 67 to determine whether a command has been transmitted by checking the light emitting block 13 of the multi-screen television receiver 1. If the command is found not transmitted, the procedure returns to step S1. Namely, if the remote controller 2 is fount not operated, the command transmission is found not executed, and a command is found not transmitted from the multi-screen television receiver 1, then the processing of steps S1, S2, and S6 are repeated.

If a command is found transmitted from the light reception block 12 of the multi-screen television receiver 1 in step S6, then the reception control block 105 controls, in step S7, the light reception block 67 to receive the command on the basis of the received optical signal and reads the information about the operation status of the television receiver 11 recorded to the received command, storing the read information into the storage block 106.

In step S8, the lighting control block 107 controls the LED 69 incorporated in the corresponding select key 21 on the basis of the operation status of the television receiver 11 stored in the storage block 106, thereby turning on predetermined lighting. For example, because the command from the television receiver 11 is transmitted from the television receiver 11 in the active status, turning on the LED 69 of the select key 21 corresponding to the television receiver 11 on the basis of the identification code 182 can identify which of the television receivers 11 is currently activated. In addition, turning on the LEDs 69 of two or more select keys 21 in different lighting patterns on the basis of the command code allows the identification of operation statuses.

The above-mentioned processing allows the lighting the LED 69 in accordance with the operation of the television receiver 11 of the multi-screen television receiver 1. This consequently allows the recognition of the operating or active television receiver 11 of the multi-screen television receiver 1 only by checking the lighting pattern of the LEDs 69 incorporated in the select keys 21 of the remote controller 2.

Figure 11:
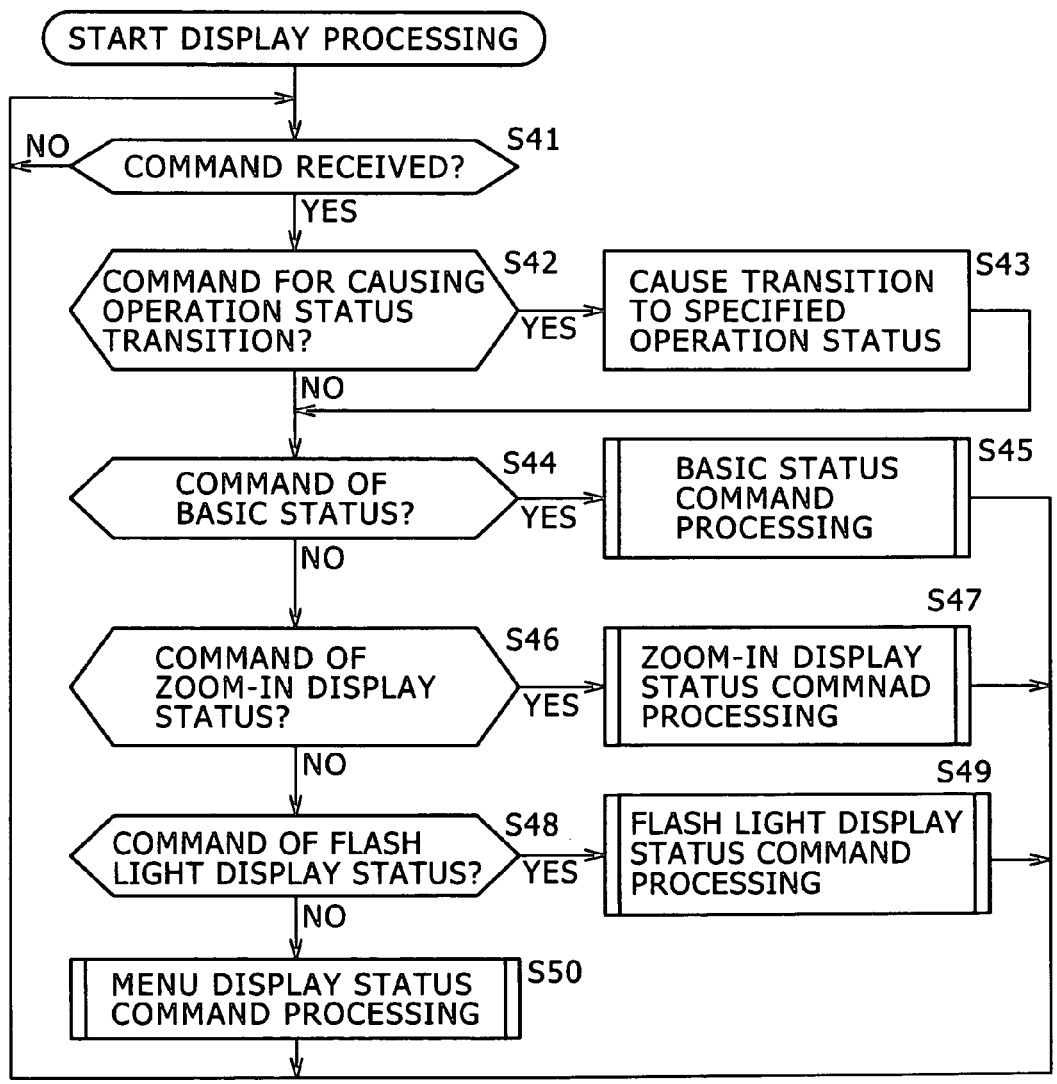
FIG. 11 is a flowchart indicative of display processing to be executed by the television receiver shown in FIG. 3.

The following describes display processing by the each television receiver 11 of the multi-screen television receiver 1 with reference to the flowchart shown in FIG. 11.

In step S41, the receive command recognition block 81 determines whether a command transmitted as an optical signal emitted from the light emitting block 66 of the remote controller 2 has been received by the light reception block 12 and repeats this processing until this command is received.

For example, if the command has been transmitted from the remote controller 2 as described in step S5 with reference to the flowchart shown in FIG. 7, then the command is determined received, upon which the procedure goes to step S42.

In step S42, the receive command recognition block 81 determines whether the received command is for causing an operation status transition.

If the command is found in step S42 to be the status transition command generated in step S22 of FIG. 8 for example, then the receive command recognition block 81 causes the operation status transition in step S43 and supplies the information about the operation status transition to the status recognition block 92. Therefore, the status recognition block 92 recognizes the operation status that is the destination of transition.

If the command is found not to be the operation status transition command in step S42, then step S43 is skipped.

In step S44, the receive command recognition block 81 determines whether the received command is a basic status command. For example, if the received command is the command generated in step S24 of FIG. 8, then this command is determined to be the command of basic status and basic status command processing is executed in step S45.

Figure 12:
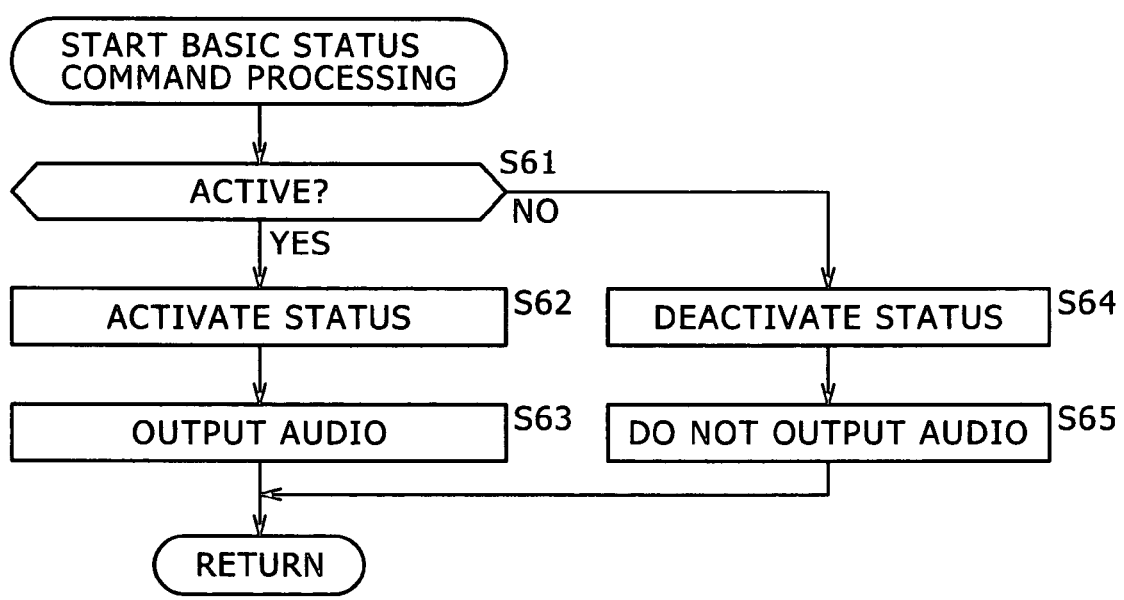
FIG. 12 is a flowchart indicative of basic status command processing.

The following describes basic status command processing with reference to FIG. 12.

In step S61, the receive command recognition block 81 determines whether the received command indicates that the television receiver 11 concerned is active. For example, if the select key 21-4 is operated in step S24, the receive command recognition block 81 of the corresponding television receiver 11-4 determines that the received command indicates that the television receiver 11-4 is active and activates the television receiver 11-4 in step S62 to control the tuner control block 82 thereof, supplying a broadcast signal received by the tuner 83 thereof to the image generation block 84 and the audio generation block 87. The image generation block 84 generates an image signal from the received broadcast signal and supplies the image signal to the image conversion block 85. The image conversion block 85 displays an image displayable on the display monitor 45 of the television receiver 11-4 on the basis of the supplied image signal.

In step S63, the receive command recognition block 81 controls the audio generation block 87 to generate an audio signal from the supplied broadcast signal and sounds the generated audio signal from the loudspeaker 47 through the audio-output control block 88.

On the other hand, if the select key 21-4 for example is operated in step S24, the receive command recognition block 81 of each of the television receiver 11-1 through 11-3 and 11-5 through 11-9 determines that the received command is not the command for indicating that the television receiver 11 concerned is active. In step S64, the receive command recognition block 81 deactivates the television receiver 11 concerned and controls the tuner control block 82 thereof to supply the broadcast signal received by the tuner 83 thereof to the image generation block 84 and the audio generation block 87. The image generation block 84 generates a image signal from the received broadcast signal and supplies the generated image signal to the image conversion block 85. The image conversion block 85 displays an image displayable on the display monitor 45 of each of the television receiver 11-1 through 11-3 and 11-5 through 11-9 on the basis of the supplied image signal.

In step S65, the receive command recognition block 81 controls the audio generation block 87 to stop the generation of an audio signal from the supplied broadcast signal, thereby stopping the output of audio from the loudspeaker 47 through the audio output control block 88.

Figure 13:
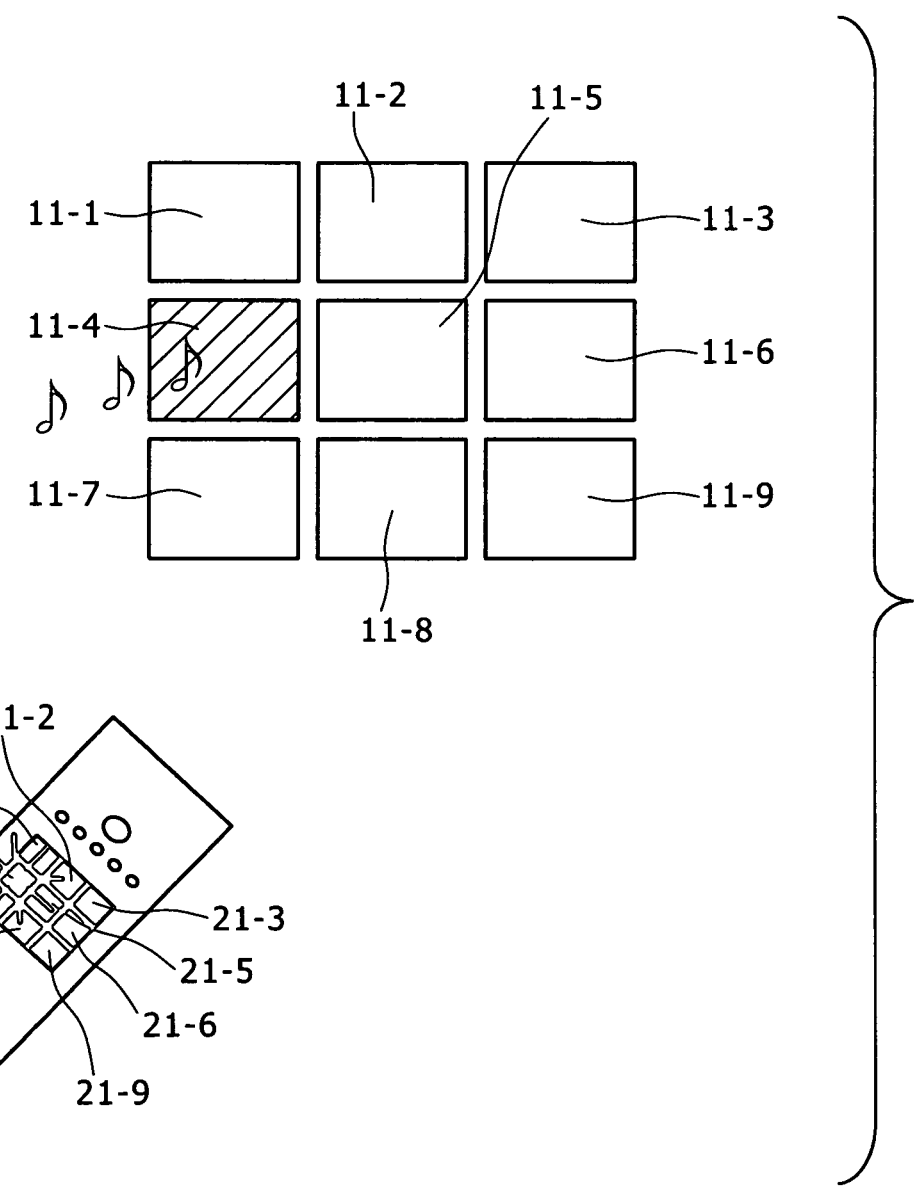
FIG. 13 is a schematic diagram illustrating the above-mentioned basic status command processing.

To be more specific, by the above-mentioned processing, the television receiver 11-4 corresponding to the select key 21-4 of the remote controller 2 sounds audio from the loudspeaker 47 along with the displaying of an image as shown in FIG. 13, but the other television receivers 11 only display an image and therefore do not output sound. As a result, in basic status, only the audio of the television receiver 11 set to the active status is outputted. At the same time, the command transmission processing to be described later causes the LED corresponding to the select key 21-4 to light as shown in FIG. 13 by a command issued from the television receiver 11-4 in step S8 of FIG. 7 described above, thereby facilitating the recognition that the television receiver 11-4 corresponding to the select key 21-4 is active.

The following describes display processing with reference to the flowchart shown in FIG. 11.

If the received command is found not to be the basic status command in step S44, then the receive command recognition block 81 determines in step S46 whether the received command is the zoom-in display status command. For example, if the received command is the command generated in step S26 shown in FIG. 8, the received command is determined to be the zoom-in display status command. Then, in step S47, zoom-in display status command processing executed.

Figure 14:
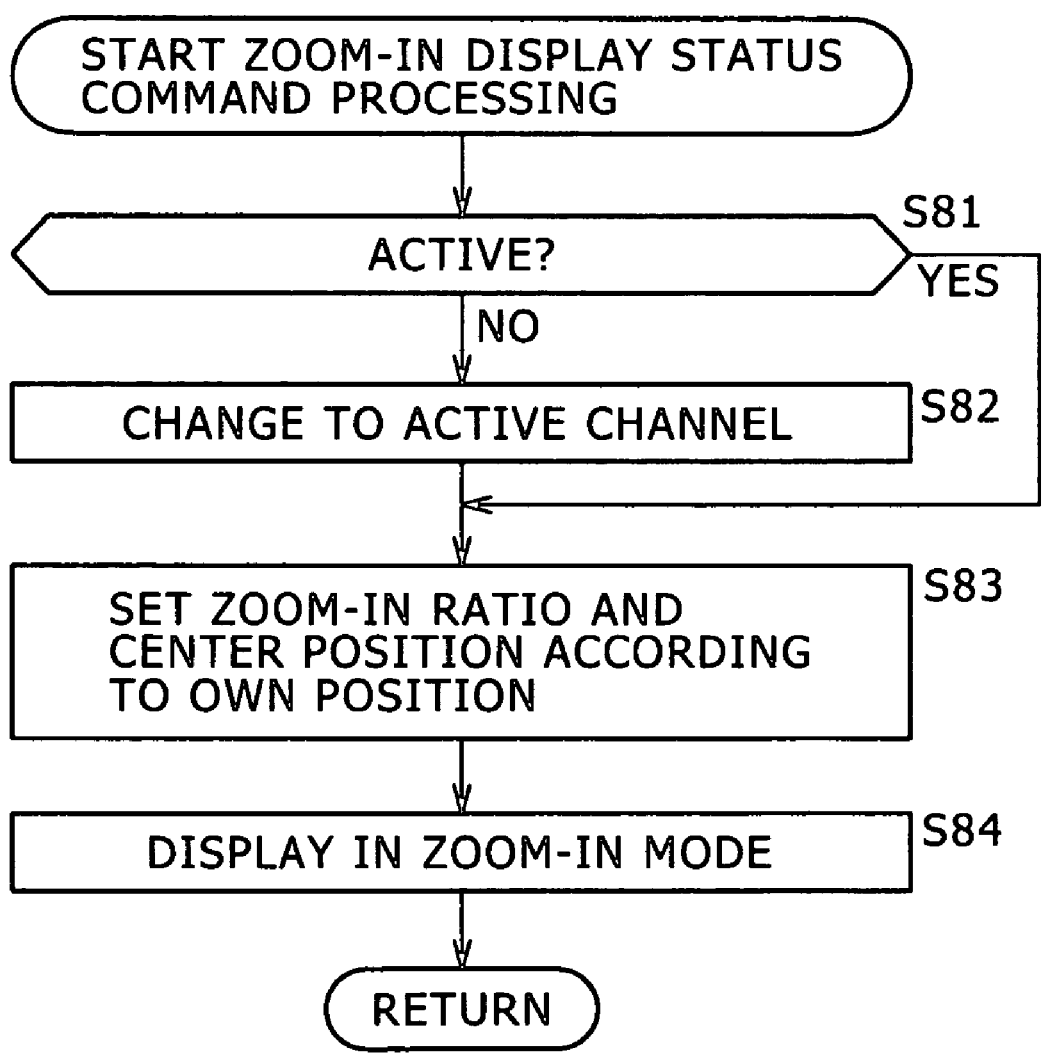
FIG. 14 is a flowchart indicative of zoom-in display status command processing.

The following describes zoom-in display status command processing with reference to FIG. 14.

In step S81, the receive command recognition block 81 determines whether the received command is a command for indicating that the television receiver 11 concerned is active. For example, if the select key 21-4 is operated in step S26, the receive command recognition block 81 of each of the television receiver 11-1 through 11-3 and 11-5 through 11-9 determines that the received command is not a command for indicating that the television receiver 11 concerned is not active and controls the tuner control block 82 in step S82 to switch the channel of the tuner 83 to the channel of the television receiver 11-4 in the active status. Namely, by this processing, the channels of all television receivers 11 are switched to the same channel as the channel of the television receiver 11-4.

On the other hand, if the television receiver 11 concerned is active, step S82 is skipped because the corresponding television receiver 11-4 has already been set to the channel thereof.

In step S83, the receive command recognition block 81 controls the image conversion block 85 to set the center position and zoom-in ratio of an image to be displayed on the basis of a positional relationship of the television receiver 11 in the multi-screen television receiver 1. Namely, with the television receiver 11-5 for example, the position thereof is the center in the multi-screen television receiver 1, so that image conversion block 85 sets an image obtained by enlarging, by threefold, the image at the center position of the display monitor 45 of the television receiver 11-5 to the center position and displays the resultant zoom-in image thereon.

On the other hand, with the television receiver 11-3 for example, the position thereof is in the upper right in the multi-screen television receiver 1, so that the image conversion block 85 sets an image obtained by enlarging, by threefold, an image in a range of ⅓ horizontally and vertically in the upper right of the display monitor 45 of the television receiver 11-3 to the center and displays the resultant zoom-in image thereon.

In step S84, the image conversion block 85 enlarges and displays an image in an area corresponding to each of positions of image signals generated by the image generation block 84 on the basis of the broadcast signal supplied from the tuner 83.

Namely, the above-mentioned processing allows the zoom-in displaying of all television receivers 11-1 through 11-9 as one display monitor such that the image displayed on the selected television receiver 11 corresponding to the select key 21 of the remote controller 2 is displayed in zoom-in display status 152 in the upper left side of FIG. 9 without especially switching the select key 21 of the remote controller 2 to the mode dedicated to zoom-in display status. At the same time, the above-mentioned processing allows the remote controller 2 to easily select a position at which zoom-in is executed.

The following continues the description of the display processing with reference to the flowchart shown in FIG. 11.

If the received command is found not to be the zoom-in display status command in step S46, then the receive command recognition block 81 determines whether the received command is the flash light display status command in step S48. For example, if the received command is the command generated in step S28 shown in FIG. 8, then this command is determined to be the flash light display status command and flash light display status command processing is executed in step S49.

Figure 15:
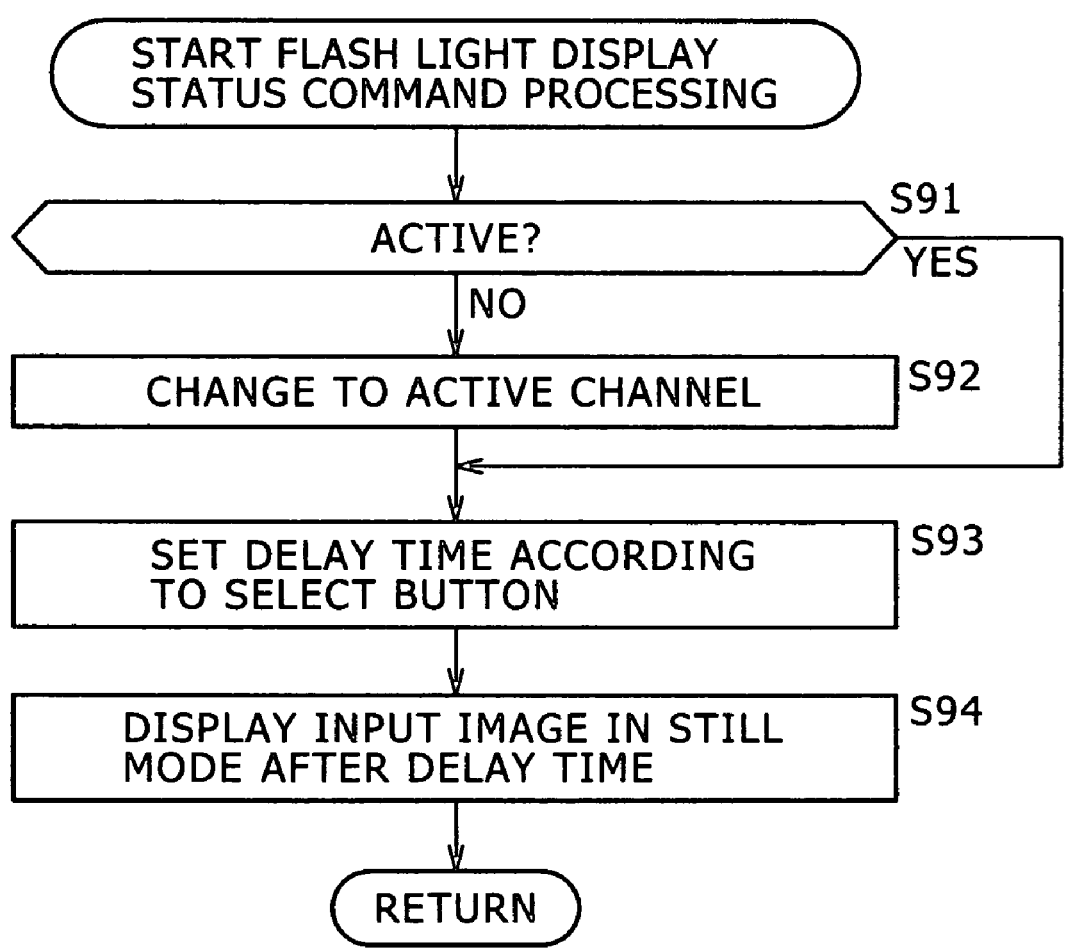
FIG. 15 is a flowchart indicative of flash light display status command processing.

The following describes the flash light display status command processing with reference to FIG. 15.

In step S91, the receive command recognition block 81 determines whether the command is a command indicating that the television receiver 11 concerned is active. For example, if the select key 21-4 is operated in step S28, the receive command recognition block 81 of each of the television receivers 11-1 through 11-3 and 11-5 through 11-9 determines that the received command indicates that the television receiver 11 concerned is not active. Then, in step S92, the receive command recognition block 81 controls the tuner control block 82 to switch the channel of the tuner 83 to the channel of the television receiver 11-4 in the active status. Namely, by this processing, the channels of all television receivers 11 are switched to the same channel as the channel of the television receiver 11-4.

On the other hand, if the television receiver 11 concerned is active, step S92 is skipped because the corresponding television receiver 11-4 has already been set to the channel thereof.

In step S93, the receive command recognition block 81 controls the image conversion block 85 to set a delay time in accordance with the position of the select key 21.

In step S94, in accordance with a timing signal supplied from the output timing control block 86, the image conversion block 85 generates a still image and displays the generated still image on the display monitor 45 on the basis of the image signal supplied from the image generation block 84 when the preset delay time has passed.

Namely, the above-mentioned processing allows the television receiver 11-1 through 11-9 to sequentially display a still image after the passing of a delay time set in correspondence with the pressed select key 21 without especially switching the select key 21 of the remote controller 2 to the mode dedicated to flash light display, thereby providing flash light display. At the same time, changing the select keys 21 in a various manner to change delay times allows flash light display.

The following continues the description of the display processing with reference to the flowchart shown in FIG. 11.

If the received command is found not to be the flash light display status command in step S48, namely, not to be the basic status command, the zoom-in status command, or the flash light display status command, then the received command is determined to be the menu display command, upon which the procedure goes to step S50, in which menu display status command processing is executed.

Figure 16:
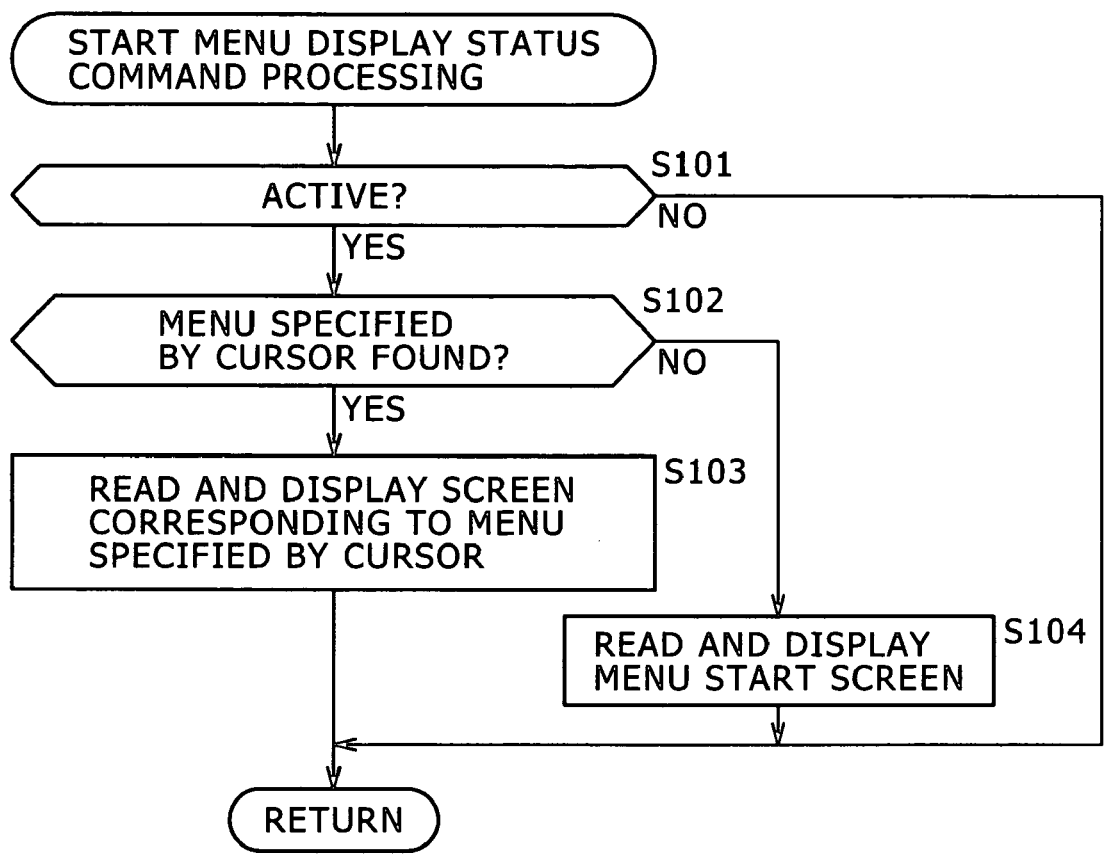
FIG. 16 is a flowchart indicative of menu display status command processing.

The following continues the description of the display processing with reference to the flowchart shown in FIG. 16.

In step S101, the receive command recognition block 81 determines whether the received command is a command indicating that the television receiver 11 concerned is active. For example, if the select key 21-4 is operated in step S29, the receive command recognition block 81 of each of the television receivers 11-1 through 11-3 and 11-5 through 11-9 determines that the received command is a command indicating that the television receiver 11 concerned is not active, upon which this processing ends.

On the other hand, if the television receiver 11 concerned is active in step S101, the receive command recognition block 81 determines in step S102 whether there is a menu pointed by the cursor that has been moved to the position corresponding to the position of the select key 21.

Figure 17:
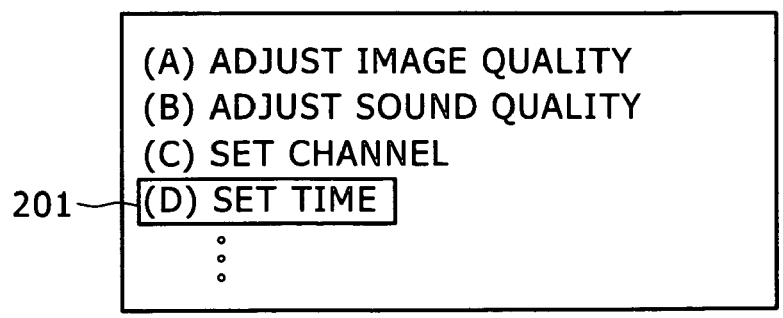
FIG. 17 is a diagram illustrating a menu screen.

In the first processing, there is no menu screen, so that there is no menu to be specified by the cursor. Therefore, the receive command recognition block 81 supplies null information to the coordinate recognition block 89 in step S104. The coordinate recognition block 89 supplies the information indicative that there is no coordinate information to the menu screen generation block 90. The menu screen generation block 90 recognizes this information as a start menu display signal, reads a start menu screen as shown in FIG. 17 for example from the menu screen memory 91, and displays this screen on the display monitor 45. In FIG. 17, select menus "(A) ADJUST IMAGE QUALITY," "(B) ADJUST SOUND QUALITY," "(C) SET CHANNEL," and "(D) SET TIME" are shown, any one of which can be selected by a cursor 201.

Figure 18:
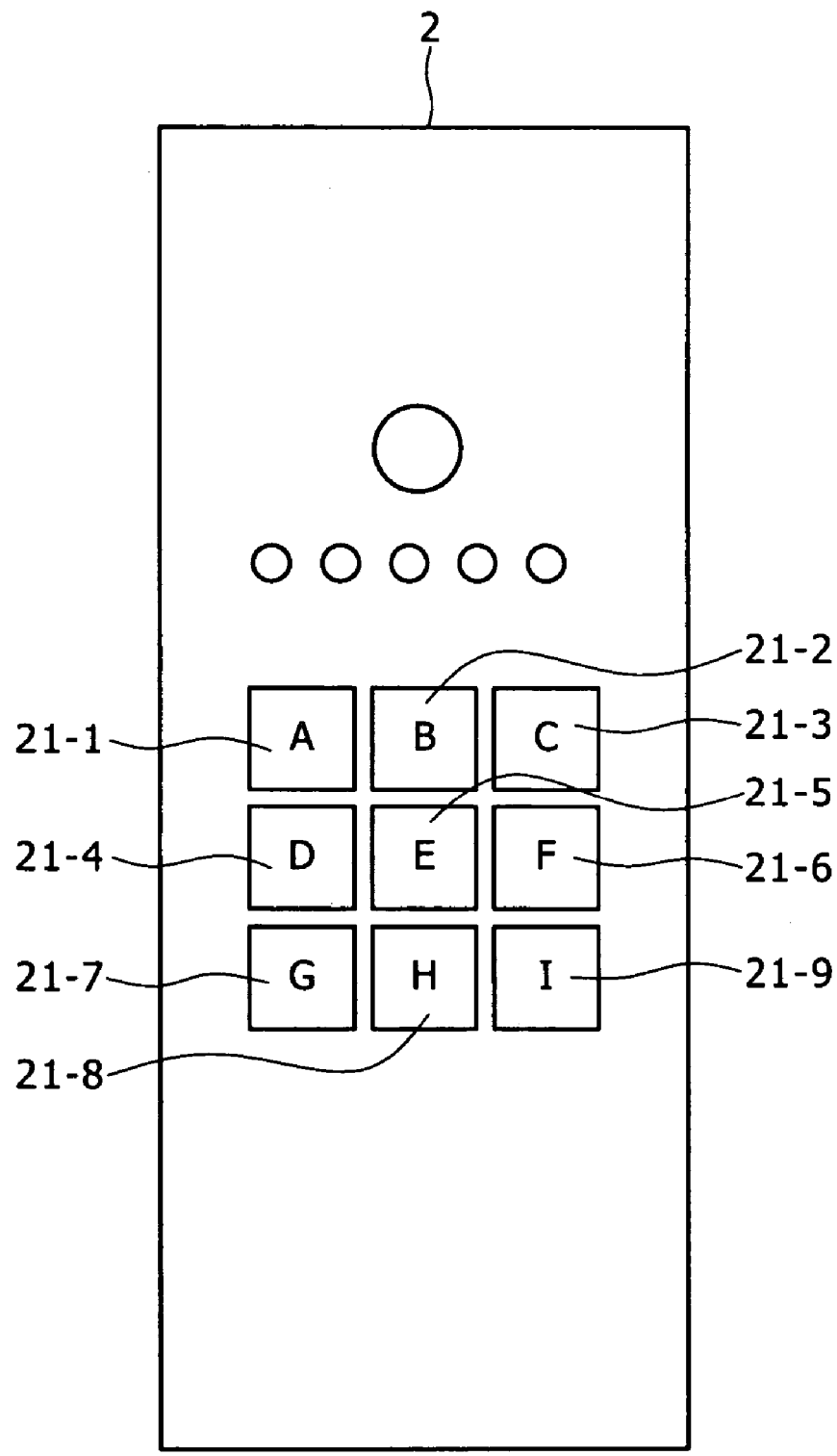
FIG. 18 is a schematic diagram illustrating one example of functions of select keys of the remote controller in menu display status.
Figure 19:
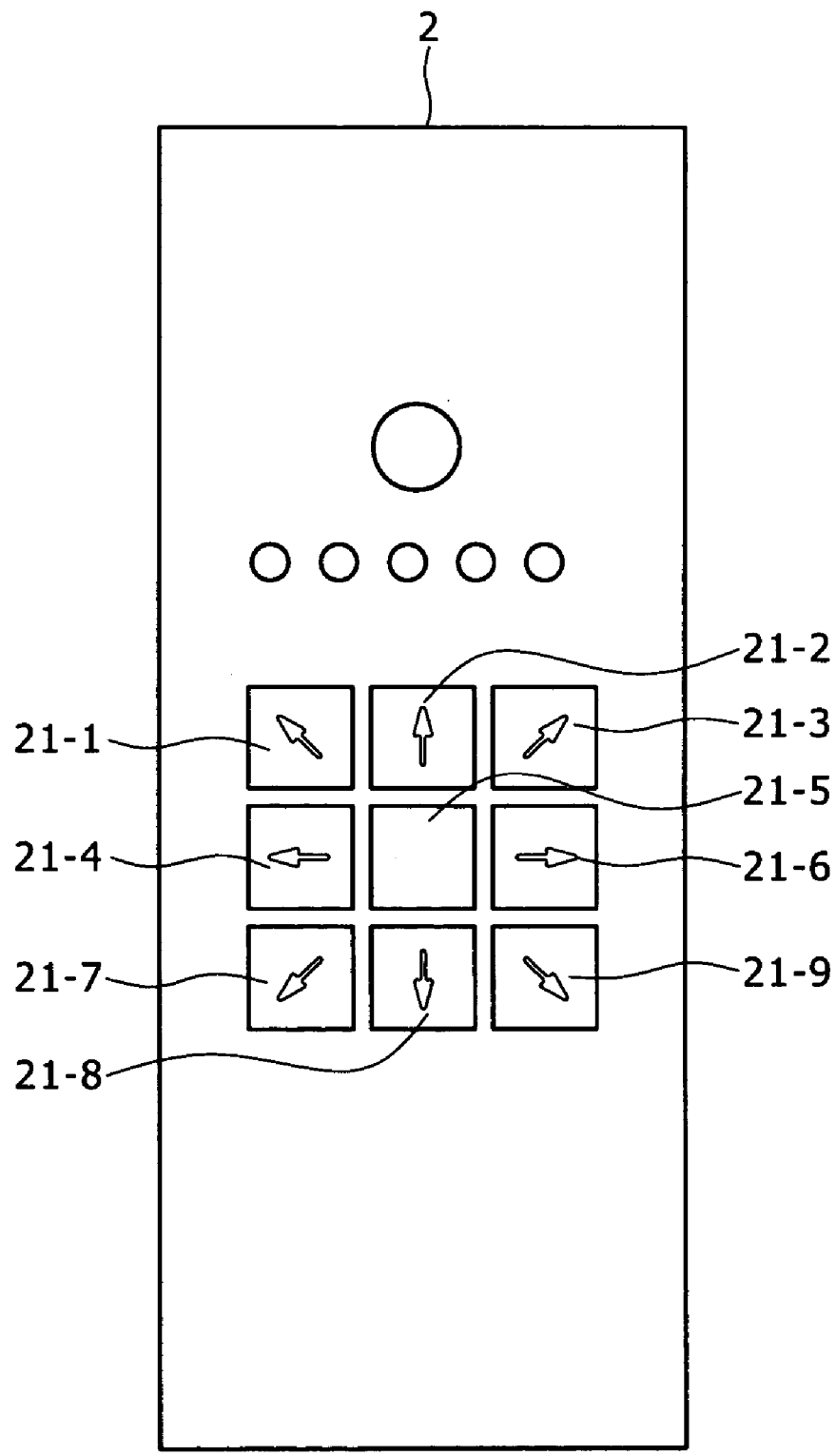
FIG. 19 is a schematic diagram illustrating another example of functions of select keys of the remote controller in menu display status.

In operating the cursor 201, the remote controller 2 may be configured such that "A," "B" through "I" be allocated to the select keys 21-1 through 21-9 respectively as shown in FIG. 18 for example for the direct selection of any of the menus. Also, as shown in FIG. 19, the move directions of the cursor 201 may be allocated to the select keys 21-1 through 21-4 and 21-5 through 21-9 respectively, thereby allowing the select key 21-5 to function as the enter button. In FIG. 19, the select key 21-1 moves the cursor obliquely left up, the select key 21-2 moves the cursor directly up, the select key 21-3 moves the cursor obliquely right up, the select key 21-4 moves the cursor directly left, the select key 21-6 moves the cursor directly right, the select key 21-7 moves the cursor obliquely left down, the select key 21-8 moves the cursor directly down, and the select key 21-9 moves the cursor obliquely right down, the select key 21-5 being allocated the function of the enter key, for example.

Figure 20:
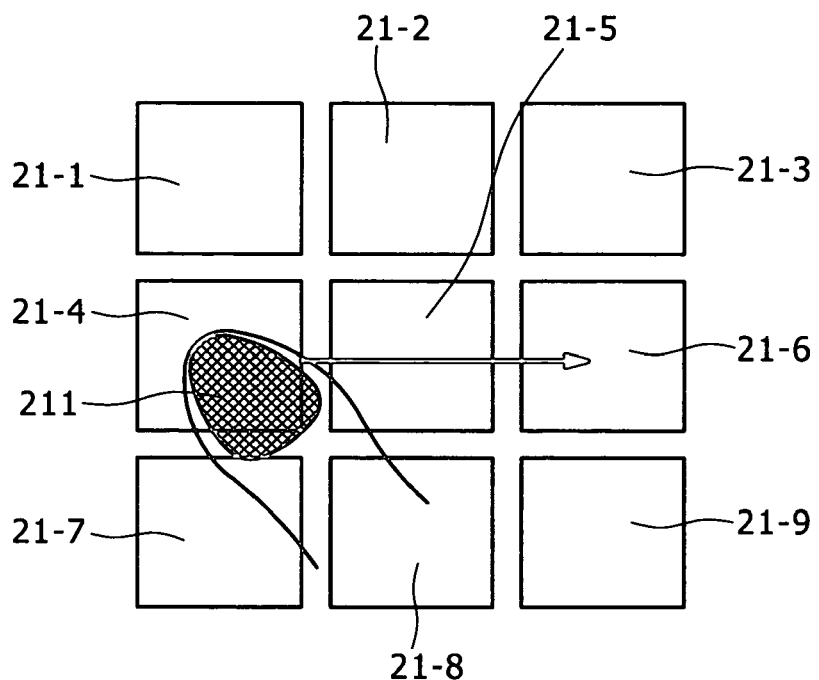
FIG. 20 is a schematic diagram illustrating still another example of functions of select keys of the remote controller in menu display status.

Because the select keys 21-1 through 21-9 are each made up of a pressure sensor, continuously pressing the select keys 21-4 through 21-6 for example in this direction with a user's finger 211 may detect the movement of the finger 211 in the right direction on the basis of a sequence in which each of the pressure sensors detects the pressure as shown in FIG. 20, thereby moving the cursor 201 in the detected direction.

If the cursor 201 is moved by the process of step S29 shown in FIG. 8 for example to "(D) SET TIME" for example shown in FIG. 17 in step S102, the corresponding menu exists, so that the procedure goes to step S103.

In step S103, the coordinate recognition block 89 recognizes the coordinate position specified by the cursor 201 and supplies recognized coordinate position to the menu screen generation block 90. The menu screen generation block 90 reads a new menu screen corresponding to the position of the cursor 201, namely, a menu screen corresponding to "(D) SET TIME" from the menu screen memory 91 and displays the menu screen on the display monitor 45.

Namely, the above-mentioned processing allows the cursor 201 to move in correspondence with the pressed select key 21 without especially switching the select key 21 of the remote controller 2 to a mode dedicated to menu screen operation, thereby executing various setting processing operations.

Figure 21:
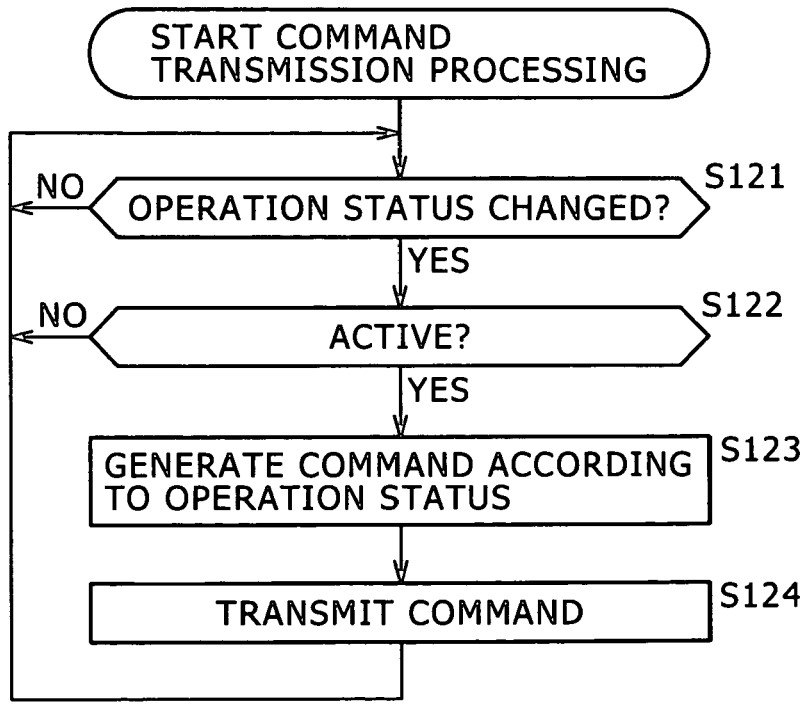
FIG. 21 is a flowchart indicative of command transmission processing.

The following describes the processing of transmitting commands to the remote controller 2 by the television receiver 11 with reference to the flowchart shown in FIG. 21.

In step S121, the status recognition block 92 determines whether the information about an operation status change has come from the receive command recognition block 81 and repeats the processing until this information comes. For example, if the information about an operation status change has come by the processing of step S43, then the status recognition block 92 determines in step S122 whether the television receiver 11 concerned is active. If the television receiver 11 concerned is found not active, then the procedure returns to step S121. Namely, if the operation status of the television receiver 11 concerned remains unchanged or the television receiver 11 concerned is not active, the processing operations of steps 121 and 122 are repeated. For example, if the television receiver 11 concerned changes in operation status or is active, then the status recognition block 92 transmits the current operation status to the send command generation block 93 in step S123 and makes the send command generation block 93 generate a command for transmitting the corresponding operation status.

In step S124, the send command generation block 93 controls the light emitting block 13 to transmit the generated command indicative of the current operation status of the television receiver 11.

As described above, the operation status is stored in the remote controller 2 in step S7 shown in FIG. 7 and the LED of the corresponding select key 21 is lighted in accordance with the type of that operation status or the position of the selected television receiver 11 in the active status in step S8.

The above-mentioned processing allows the remote controller 2 to store the operation status of the multi-screen television receiver 1, thereby recognizing one of basic status, zoom-in display status, flash light display status, and menu display status on the basis of the stored information. Consequently, the multi-screen television receiver 1 can be easily operated by the remote controller 2 without user's switching between the functions of the select keys 21 in accordance with two or more operation statuses. Therefore, this novel configuration makes it unnecessary to add new operation keys if new functions are added.

Figure 22:
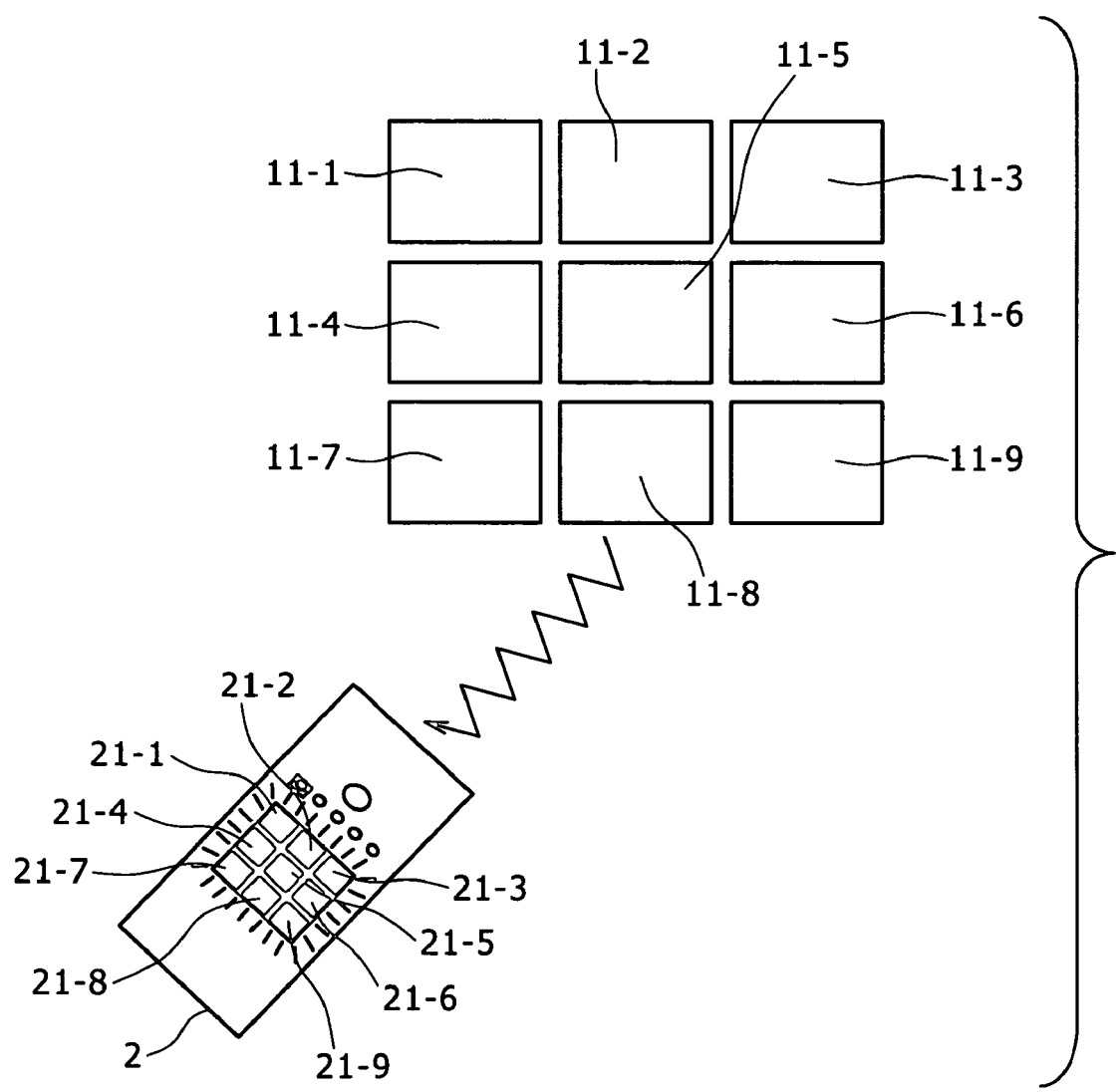
FIG. 22 is a schematic diagram illustrating an example in which radiating colors of LEDs (Light Emitting Diodes) of the remote controller are changed in accordance with operation statuses.

In the above description, an example is used in which the LED 69 at the position corresponding to the position of the selected select key 21 is lighted. It is also practicable the radiated colors of the LED may be changed in accordance with operation statuses as shown in FIG. 22, for example.

Figure 23:
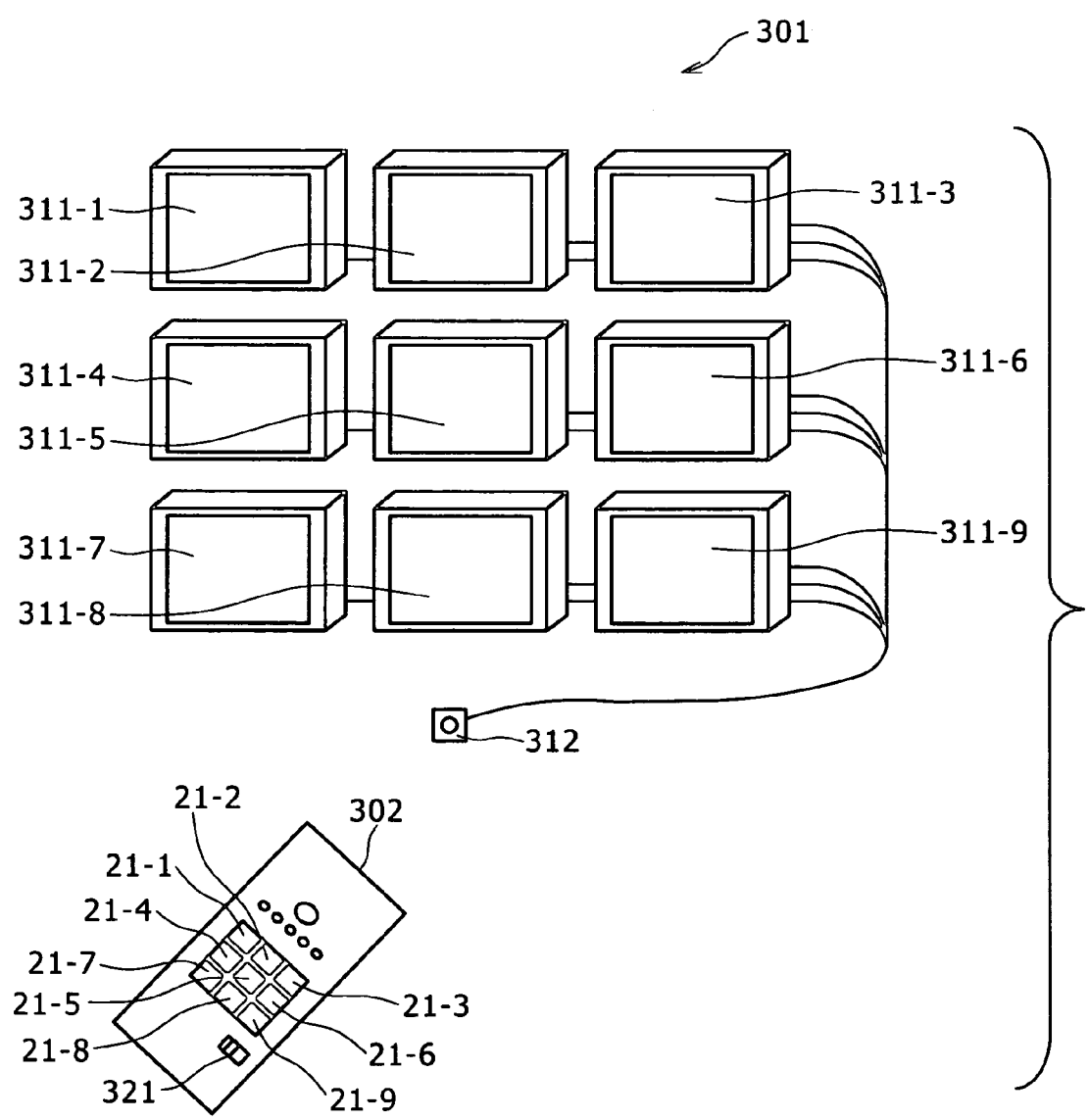
FIG. 23 is a schematic diagram illustrating an exemplary configuration of a multi-screen television receiver remote control system practiced as a yet different embodiment of the invention.
Figure 24:
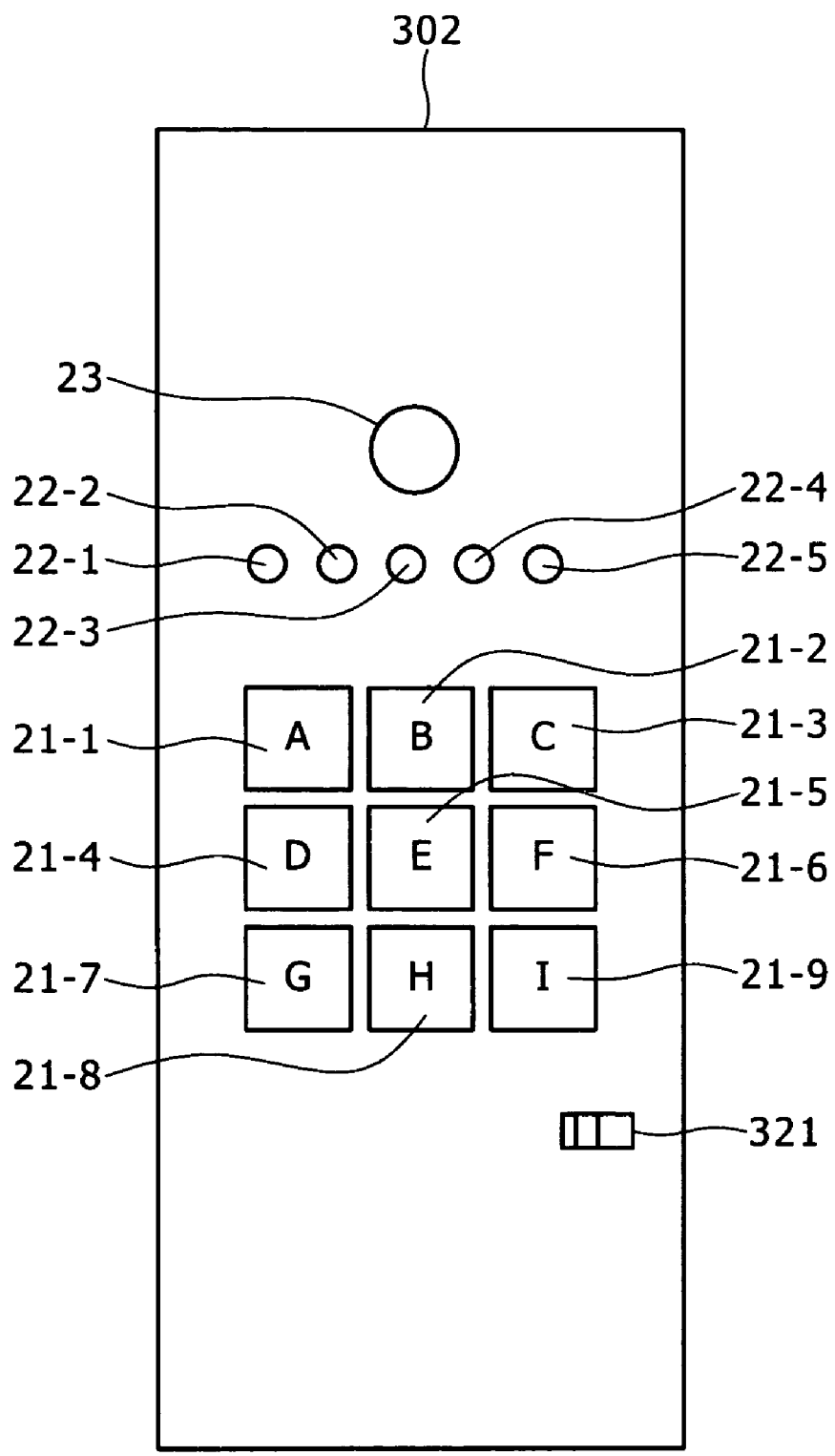
FIG. 24 is a schematic diagram illustrating an exemplary configuration of a remote controller for use with the multi-screen television receiver remote control system shown in FIG. 23.

In the above description, an example is used in which the multi-screen television receiver 1 and the remote controller 2 can mutually transmit and receive commands. It is also practicable that commands can be transmitted only from a remote controller 302 to a multi-screen television receiver 301 as shown in FIG. 23. In this configuration, a switch 321 may be arranged to switch between the functions of the select keys 21 as shown in FIG. 24.

Referring to FIG. 23, a light reception block 312 for receiving commands from the remote controller 302 is arranged. The multi-screen television receivers 311-1 through 311-9 operate in accordance with received commands. The multi-screen television receiver 311 of the multi-screen television receiver 301 shown in FIG. 23 has substantially the same functions as those of the television receiver 11 of the multi-screen television receiver 1 shown in FIG. 1 except for the configuration corresponding to the light emitting block 13. The remote controller 302 has substantially the same functions as those of the remote controller 2 shown in FIG. 1 except for the switch 321 as shown in FIG. 24.

The switch 321 horizontally slides in two steps; for example, when the switch 321 is set to the left side, the select keys 21-1 through 21-9 function as keys for switching the corresponding television receivers 311-1 through 311-9 to the active status. On the other hand, when the switch 321 is set to the right side, the select keys 21-1 through 21-9 switch between the operation statuses in cooperation with the operation of the select key 21: for example, in zoom-in display status, the select keys 21 function as keys for selecting any of the television receivers 311-1 through 311-9 to be displayed in zoom-in mode; in flash light display status, the select keys 21 function as keys for selecting delay times by the television receivers 311-1 through 311-9 to be displayed in zoom-in mode; and, in menu display status, the select keys 21 function as keys for moving the cursor in the menu screen.

It should be noted that various operations are substantially the same as those described before with reference to the multi-screen television receiver 1 except for the transmission of commands from the multi-screen television receiver 301 to the remote controller 302, so the description of these various operations will be skipped.

In the above description, an example is used in which status transition is made between four statuses, basic status, zoom-in display status, flash light display status, and menu display status. It is also practicable to provide other operation statuses; for example, slide show display status. Slide show display status denotes that a scene change part in a stream image for example distributed as a broadcast signal is detected to sequentially display still images in scene change timings onto the television receivers 11-1 through 11-9.

As described and according to embodiments of the invention, the multi-screen television receiver can be operated by the remote controller with ease.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

FIG. 25 shows one embodiment of a personal computer for implementing by software electrical internal configurations of the multi-screen television receivers 1 and 301 and the remote controllers 2 and 302 shown in FIGS. 1 and 23. A CPU 501 of this personal computer controls the entire operation of the personal computer. Also, when a command is entered from an input block 506 based on keyboard and mouse for example by the user through a bus 504 and an input/output interface 505, the CPU 501 executes a corresponding computer program stored in a ROM (Read Only Memory) 502. In addition, the CPU 501 loads a computer program read from a removable media 511 including magnetic disc, optical disc, magneto-optical disc, or semiconductor memory connected to a drive 510 and stored in a storage block 508 into a RAM (Random Access Memory) 503 for execution. This configuration implements the functions of the multi-screen television receivers 1 and 301 shown in FIGS. 1 and 23 respectively. Further, the CPU 501 controls a communication block 509 to communicate with the outside the system, thereby transmitting and receiving data.

As shown in FIG. 25, program recording media for storing programs that are installed on a computer for execution is made up of the removable media 511 that are package media made up of a magnetic disc (including a flexible disc), an optical disc (including CD-ROM (Compact Disc-Read Only Memory), a DVD (Digital Versatile Disc), a magneto-optical disc, or a semiconductor memory, the ROM 502 in which programs are temporarily or permanently stored, or a hard disc drive that forms the storage block 508. Storing of programs into program recording media is executed by use of wired or wireless communication media, such as a LAN, the Internet, or digital satellite broadcasting, via the communication block 509 that provides an interface, such as a router and a modem, as required.

It should be noted herein that the steps for describing each program recorded in recording media include not only the processing operations which are sequentially executed in a time-dependent manner but also the processing operations which are executed concurrently or discretely.

While preferred embodiments of the present invention have been described using specific terms, such description is for illustrative purpose only, and it is to be understood that changes and variations may be made without departing from the spirit or scope of the following claims.

It should also be noted that term "system" as used herein denotes an entire apparatus configured by a plurality of component units.

The invention claimed is:

1. A multi-screen television receiver remote control system, comprising:
  a multi-screen television receiver including a plurality of television receivers arranged in a two-dimensional array; and
  a remote controller configured to control the multi-screen television receiver, the remote controller including:
    determining means for determining an operation status of each of the plurality of television receivers,
    manipulating means for receiving user operations and including a two-dimensional array of select keys corresponding in position to the two-dimensional array of television receivers,
    remote control command generating means for generating a remote control command to be transmitted to the plurality of television receivers based on the operation status of the television receivers and contents of the user operations including user operations of the two-dimensional array of select keys, and
    transmitting means for transmitting the remote control command; and
  the multi-screen television receiver including:
    receiving means for receiving the remote control command from the remote controller,
    recognizing means for recognizing a status of each of the plurality of television receivers, and
    executing means for executing predetermined processing for each of the plurality of television receivers based on the recognized status of the television receivers and the remote control command received by the receiving means,
    wherein each of the two-dimensional array of select keys includes a respective light emitting means for emitting light based on the operation status of the corresponding one of the plurality of television receivers,
    the remote control command generating means generates a selected one of a plurality of remote control commands, the plurality of remote control commands including a command for delaying an image displayed on the activated television receiver by a predetermined time to sequentially display the image on the plurality of television receivers and a command for changing the predetermined time of the delay, the respective light emitting means of two or more of the select keys being activated in different lighting patterns based on the selected remote control command, and in absence of the remote control command being received by the receiving means, the multi-screen television receiver displays, as a default, different channels on each of the plurality of television receivers.

2. A remote controller for controlling a multi-screen television receiver including a plurality of television receivers arranged in a two-dimensional array, the remote controller comprising:
determining means for determining an operation status of each of the plurality of television receivers;
manipulating means for receiving user operations and including a two-dimensional array of select keys corresponding in position to the two-dimensional array of television receivers;
remote control command generating means for generating a remote control command to be transmitted to the plurality of television receivers based on the operation status of the television receivers and contents of the user operations including user operations of the two-dimensional array of select keys; and
transmitting means for transmitting the remote control command to the multi-screen television receiver,
wherein each of the two-dimensional array of select keys includes a respective light emitting means for emitting light based on the operation status of the corresponding one of the plurality of television receivers,
the remote control command generating means generates a selected one of a plurality of remote control commands, the plurality of remote control commands including a command for delaying an image displayed on the activated television receiver by a predetermined time to sequentially display the image on the plurality of television receivers and a command for changing the predetermined time of the delay, the respective light emitting means of two or more of the select keys being activated in different lighting patterns based on the selected remote control command, and
in absence of the remote control command being received by the receiving means, the multi-screen television receiver displays, as a default, different channels on each of the plurality of television receivers.

3. The remote controller according to claim 2, further comprising:
status storing means for storing the operation status of each of the plurality of television receivers.

4. The remote controller according to claim 3, further comprising:
receiving means for receiving a television command from the plurality of television receivers,
the status storing means storing the operation status of each of the plurality of television receivers based on the television command.

5. The remote controller according to claim 2, wherein the plurality of remote control commands generated by the remote control command generating means includes a command for activating any one of the plurality of television receivers to output audio at least based on the operation status of the television receivers and the contents of the user operations, a command for enlarging an image displayed on the activated television receiver to display the enlarged image on the plurality of television receivers, and a command for displaying a menu screen to execute a setting operation.

6. The remote controller according to claim 2, wherein the manipulating means is made up of a pressure sensor, and the remote control command generating means generates a command to be transmitted to the plurality of television receivers based on the operation status of the television receivers and a result of detection of the pressure sensor.

7. A method for controlling a remote controller for controlling a multi-screen television receiver including a plurality of television receivers arranged in a two-dimensional array, the method comprising:
determining an operation status of each of the plurality of television receivers;
receiving a user operation using a two-dimensional array of select keys corresponding in position to the two-dimensional array of television receivers;
generating a remote control command to be transmitted to the plurality of television receivers based on the operation status of the television receivers and contents of the user operation including user operations of the two-dimensional array of select keys; and
transmitting the remote control command to the multi-screen television receiver,
wherein each of the two-dimensional array of select keys includes a respective light emitting means for emitting light based on the operation status of the corresponding one of the plurality of television receivers,
the generating step generates a selected one of a plurality of remote control commands, the plurality of remote control commands including a command for delaying an image displayed on the activated television receiver by a predetermined time to sequentially display the image on the plurality of television receivers and a command for changing the predetermined time of the delay, the respective light emitting means of two or more of the select keys being activated in different lighting patterns based on the selected remote control command, and
in absence of the remote control command being generated by the generating step, the multi-screen television receiver displays, as a default, different channels on each of the plurality of television receivers.

8. A non-transitory recording medium recorded with a computer-readable program for controlling a remote controller for controlling a multi-screen television receiver including a plurality of television receivers arranged in a two-dimensional array, the computer-readable program comprising:
determining an operation status of each of the plurality of television receivers;
receiving a user operation using a two-dimensional array of select keys corresponding in position to the two-dimensional array of television receivers;
generating a remote control command to be transmitted to the plurality of television receivers based on the operation status of the television receivers and contents of the user operation including user operations of the two-dimensional array of select keys; and
transmitting the remote control command to the multi-screen television receiver,
wherein each of the two-dimensional array of select keys includes a respective light emitting means for emitting light based on the operation status of the corresponding one of the plurality of television receivers,
the generating step generates a-a selected one of a plurality of remote control commands, the plurality of remote control commands including a command for delaying an image displayed on the activated television receiver by a predetermined time to sequentially display the image on the plurality of television receivers and a command for changing the predetermined time of the delay, the respective light emitting means of two or more of the select keys being activated in different lighting patterns based on the selected remote control command, and in absence of the remote control command being generated by the generating step, the multi-screen television receiver displays, as a default, different channels on each of the plurality of television receivers.

9. A processor encoded with a non-transitory computer-readable program for executing a method for controlling a remote controller for controlling a multi-screen television receiver including a plurality of television receivers arranged in a two-dimensional array, the method comprising:
   determining an operation status of each of the plurality of television receivers;
   receiving a user operation using a two-dimensional array of select keys corresponding in position to the two-dimensional array of television receivers;
   generating a remote control command to be transmitted to the plurality of television receivers based on the operation status of the television receivers and contents of the user operation including user operations of the two-dimensional array of select keys; and
   transmitting the remote control command to the multi-screen television receiver,
   wherein each of the two-dimensional array of select keys includes a respective light emitting means for emitting light based on the operation status of the corresponding one of the plurality of television receivers,
   the generating step generates a selected one of a plurality of remote control commands, the plurality of remote control commands including a command for delaying an image displayed on the activated television receiver by a predetermined time to sequentially display the image on the plurality of television receivers and a command for changing the predetermined time of the delay, the respective light emitting means of two or more of the select keys being activated in different lighting patterns based on the selected remote control command, and
   in absence of the remote control command being generated by the generating step, the multi-screen television receiver displays, as a default, different channels on each of the plurality of television receivers.

10. The multi-screen television receiver remote control system according to claim 1, wherein the multi-screen television receiver further comprises:
    transmitting means for transmitting, as a television command, the recognized operation status for each of the plurality of television receivers.

11. The multi-screen television receiver remote control system according to claim 1, wherein the executing means of the multi-screen television receiver activates any one of the plurality of television receivers to output audio at least based on the recognized operation status of the television receivers and the remote control command, enlarges an image displayed on the activated television receiver to display the enlarged image on the plurality of television receivers, and displays a menu screen to execute a setting operation.

12. A multi-screen television receiver remote control system, comprising:
    a multi-screen television receiver including a plurality of television receivers arranged in a two-dimensional array; and
    a remote controller configured to control the multi-screen television receiver,
    the remote controller including:
        a determining section configured to determine an operation status of each of the plurality of television receivers,
        a manipulating section configured to receive user operations and including a two-dimensional array of select keys corresponding in position to the two-dimensional array of television receivers,
        a remote control command generating section configured to generate a remote control command to be transmitted to the plurality of television receivers based on the operation status of the television receivers and contents of the user operations including user operations of the two-dimensional array of select keys, and
        a transmitting section configured to transmit the remote control command; and
    the multi-screen television receiver including:
        a receiving section configured to receive the remote control command from the remote controller,
        a recognizing section configured to recognize a status of each of the plurality of television receivers, and
        an executing section configured to execute predetermined processing for each of the plurality of television receivers based on the recognized status of the television receivers and the remote control command received by the receiving section,
    wherein each of the two-dimensional array of select keys includes a respective light emitting means for emitting light based on the operation status of the corresponding one of the plurality of television receivers,
    the remote control command generating section generates a selected one of a plurality of remote control commands, the plurality of remote control commands including a command for delaying an image displayed on the activated television receiver by a predetermined time to sequentially display the image on the plurality of television receivers and a command for changing the predetermined time of the delay, the respective light emitting means of two or more of the select keys being activated in different lighting patterns based on the selected remote control command, and
    in absence of the remote control command being received by the receiving section, the multi-screen television receiver displays, as a default, different channels on each of the plurality of television receivers.

13. A remote controller for controlling a multi-screen television receiver including a plurality of television receivers arranged in a two-dimensional array, the remote controller comprising:
    a determining section configured to determine an operation status of each of the plurality of television receivers;
    a manipulating section configured to receive user operations and including a two-dimensional array of select keys corresponding in position to the two-dimensional array of television receivers;
    a remote control command generating section configured to generate a remote control command to be transmitted to the plurality of television receivers based on the operation status of the television receivers and contents of the user operations including user operations of the two-dimensional array of select keys; and
    a transmitting section configured to transmit the remote control command to the multi-screen television receiver,
    wherein each of the two-dimensional array of select keys includes a respective light emitting means for emitting light based on the operation status of the corresponding one of the plurality of television receivers, the remote control command generating section generates a selected one of a plurality of remote control commands, the plurality of remote control commands including a command for delaying an image displayed on the activated television receiver by a predetermined time to sequentially display the image on the plurality of television receivers and a command for changing the predetermined time of the delay, the respective light emitting means of two or more of the select keys being activated in different lighting patterns based on the selected remote control command, and in absence of the remote control command being generated by the generating section, the multi-screen television receiver displays, as a default, different channels on each of the plurality of television receivers.

* * * * *